United States Patent [19]

Carosso

[11] Patent Number: 4,783,760
[45] Date of Patent: Nov. 8, 1988

[54] WORD PROCESSING TEXT JUSTIFICATION METHOD

[75] Inventor: Robert M. Carosso, Billerica, Mass.

[73] Assignee: Honeywell Bull Inc., Waltham, Mass.

[21] Appl. No.: 740,700

[22] Filed: Jun. 3, 1985

[51] Int. Cl.$^4$ .............................................. B41J 5/30
[52] U.S. Cl. ...................................... 364/900; 400/3; 364/300
[58] Field of Search ... 364/200 MS File, 900 MS File, 364/300; 400/3, 4, 5, 6, 7, 9, 12, 13, 15

[56] References Cited

U.S. PATENT DOCUMENTS

| | | | |
|---|---|---|---|
| 2,678,713 | 4/1954 | Higonnet et al. | 400/3 |
| 3,757,921 | 9/1973 | Bishop | 400/12 |
| 4,005,772 | 2/1977 | Kieffer et al. | 400/10 |
| 4,138,719 | 2/1979 | Swanstrom et al. | 364/200 |
| 4,265,554 | 5/1981 | Clancy et al. | 400/316 |
| 4,298,290 | 11/1981 | Barnes et al. | 400/3 |
| 4,348,738 | 9/1982 | Grier et al. | 364/900 |
| 4,462,701 | 7/1984 | Czyszczewski et al. | 364/900 |
| 4,523,294 | 6/1985 | Winn | 364/900 |
| 4,573,138 | 2/1986 | Gaudet et al. | 364/900 |
| 4,574,363 | 3/1986 | Carlgren et al. | 364/900 |
| 4,689,764 | 8/1987 | Daniels | 364/900 |

OTHER PUBLICATIONS

MicroPro International Corporation, WordStar General Information Manual, 1981, p. 8—8.
Bonney, The WordStar Customizing Guide, 1986, pp. 128-129.
Stone, Getting the Most from WordStar and Mail-Merge, 1984, pp. 9-10.
IBM Manual "Document Content Architecture: Final--Form-Text Reference", First Edition, Jun. 1983.
IBM Manual "Document Content Architecture: Revisable-Form-Text Reference," SC23-0758-0, First Edition, Jun. 1983.

Primary Examiner—Gareth D. Shaw
Assistant Examiner—Kevin A. Kriess
Attorney, Agent, or Firm—George Grayson; John S. Solakian

[57] ABSTRACT

A method for performing margin justification in a word processing system by expanding the separation between words and between characters within words. Justifying lines of text by use of this method results in lines of text with an aesthetically pleasing uniform margin. The method uses the granular units of output devices so that one justification procedure can be used on all output devices.

10 Claims, 17 Drawing Sheets

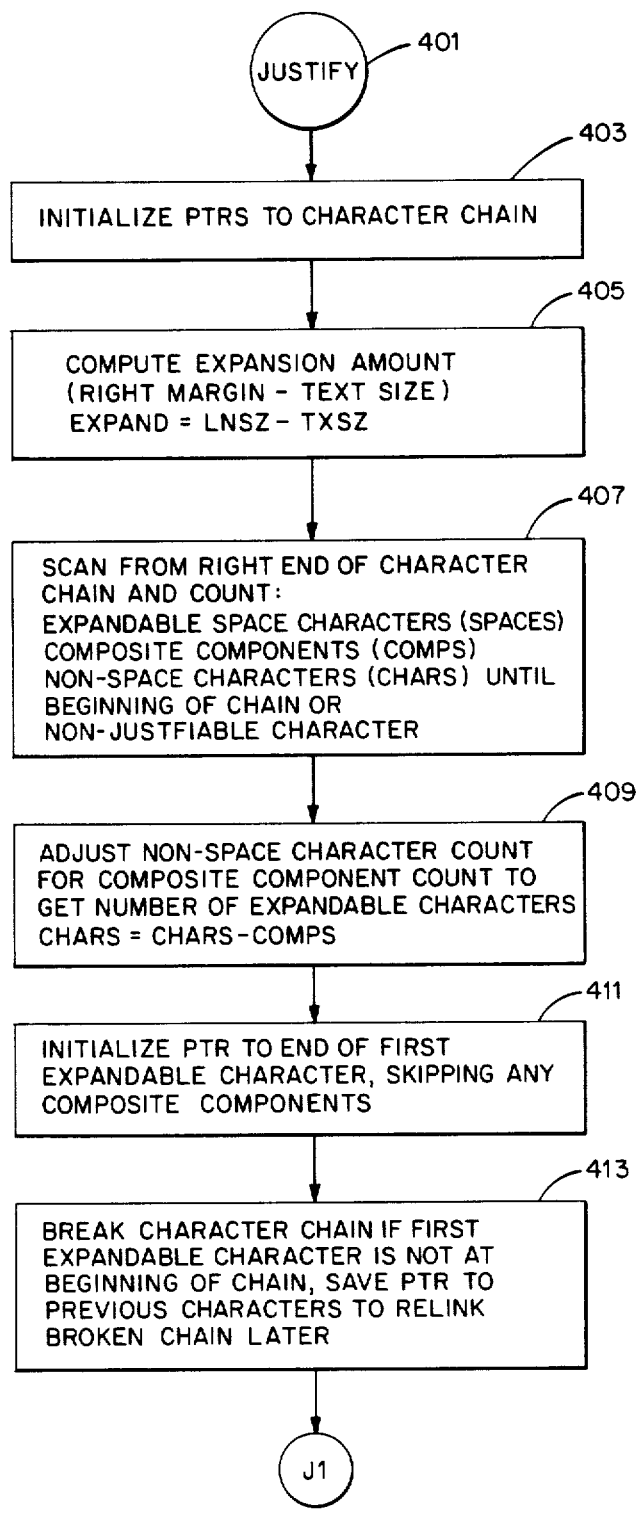
Fig. 4. (sheet 1 of 5)

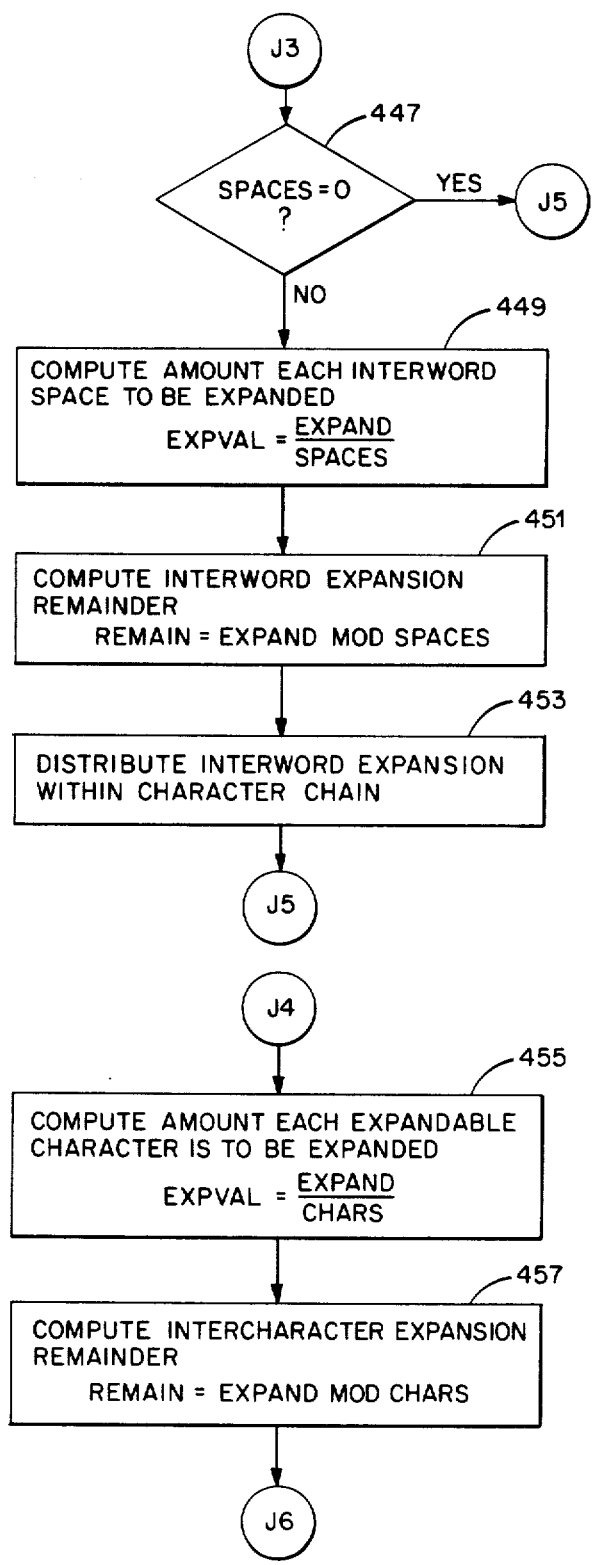
Fig. 4. (sheet 4 of 5)

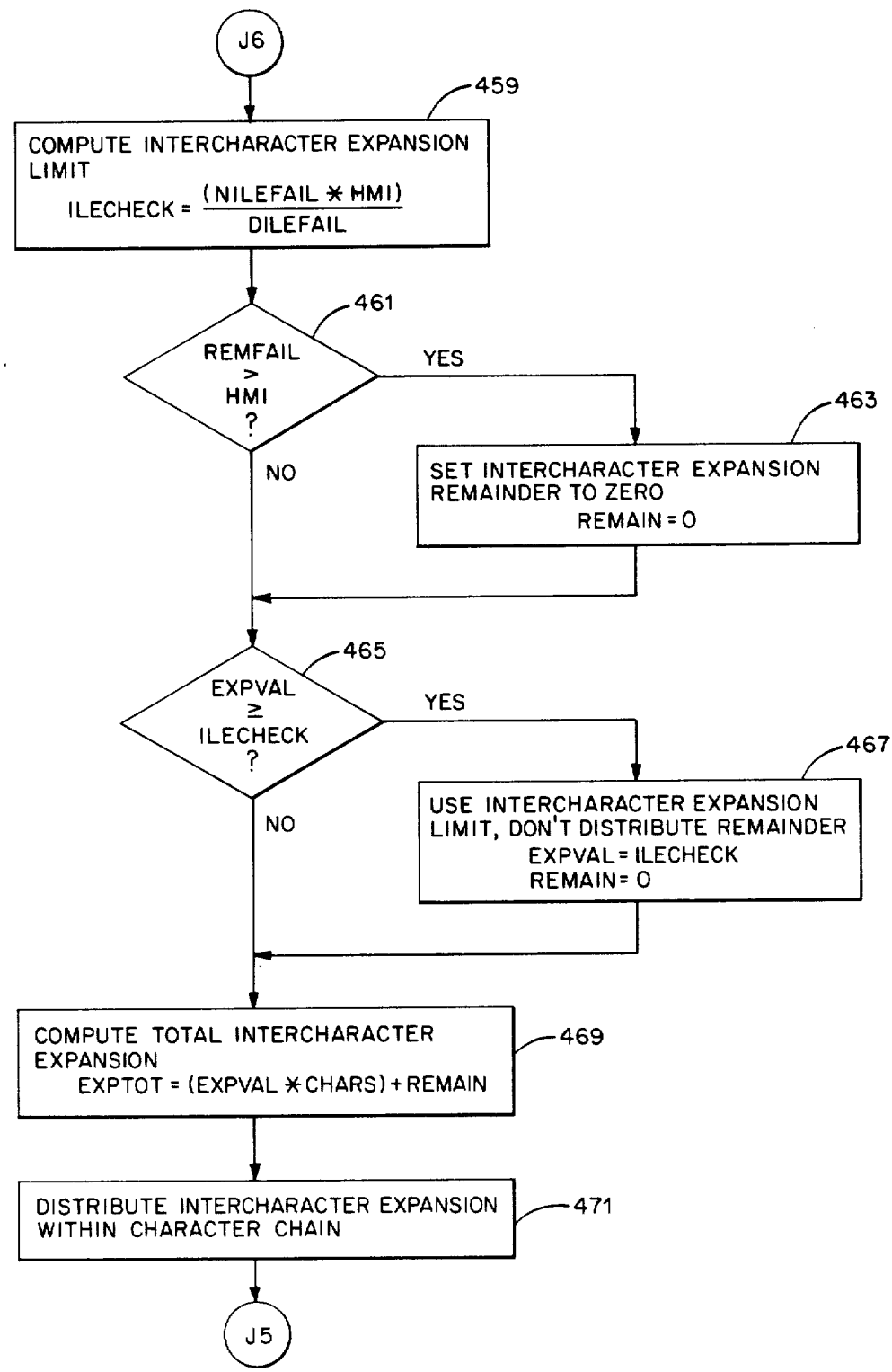
Fig. 4. (sheet 5 of 5)

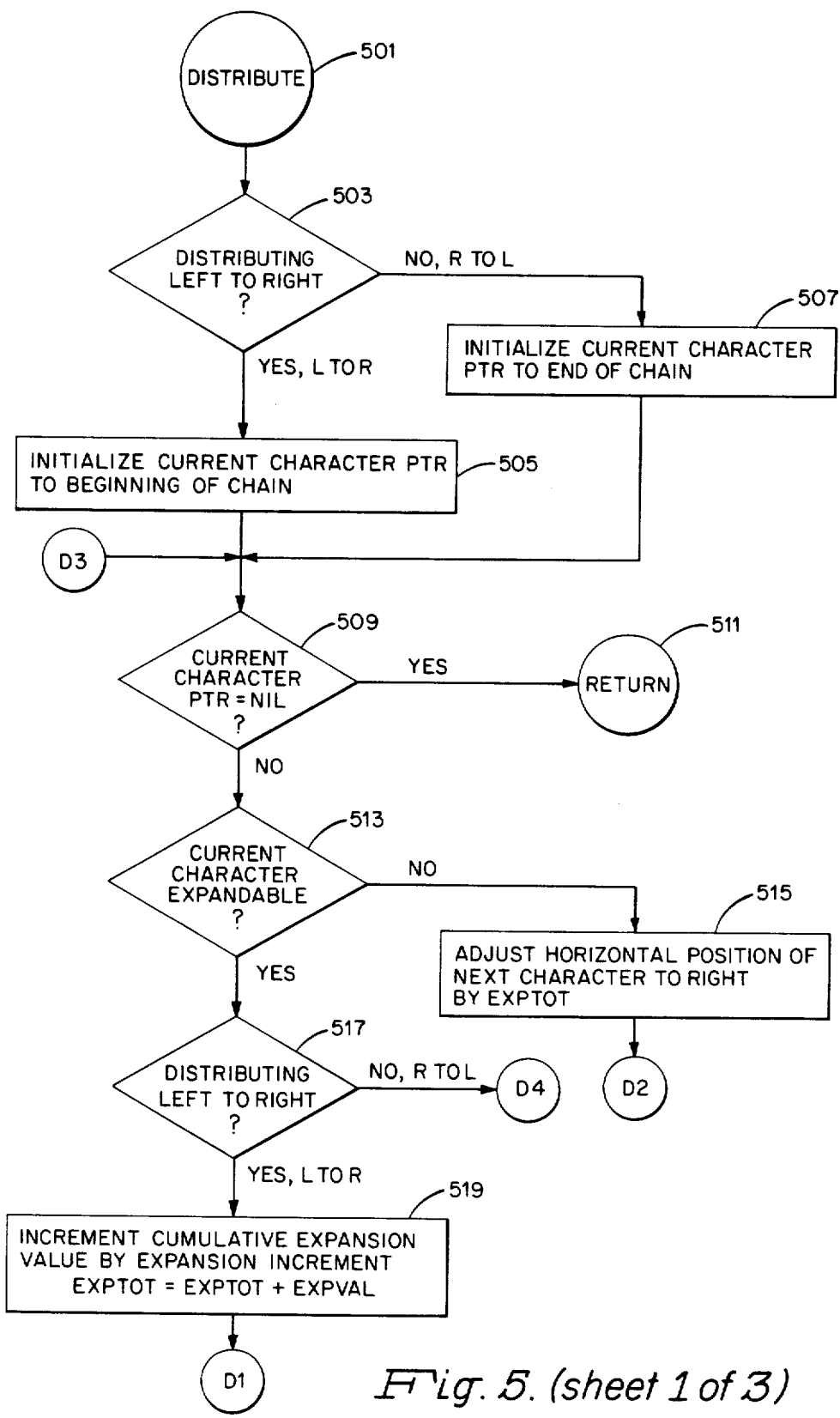
Fig. 5. (sheet 1 of 3)

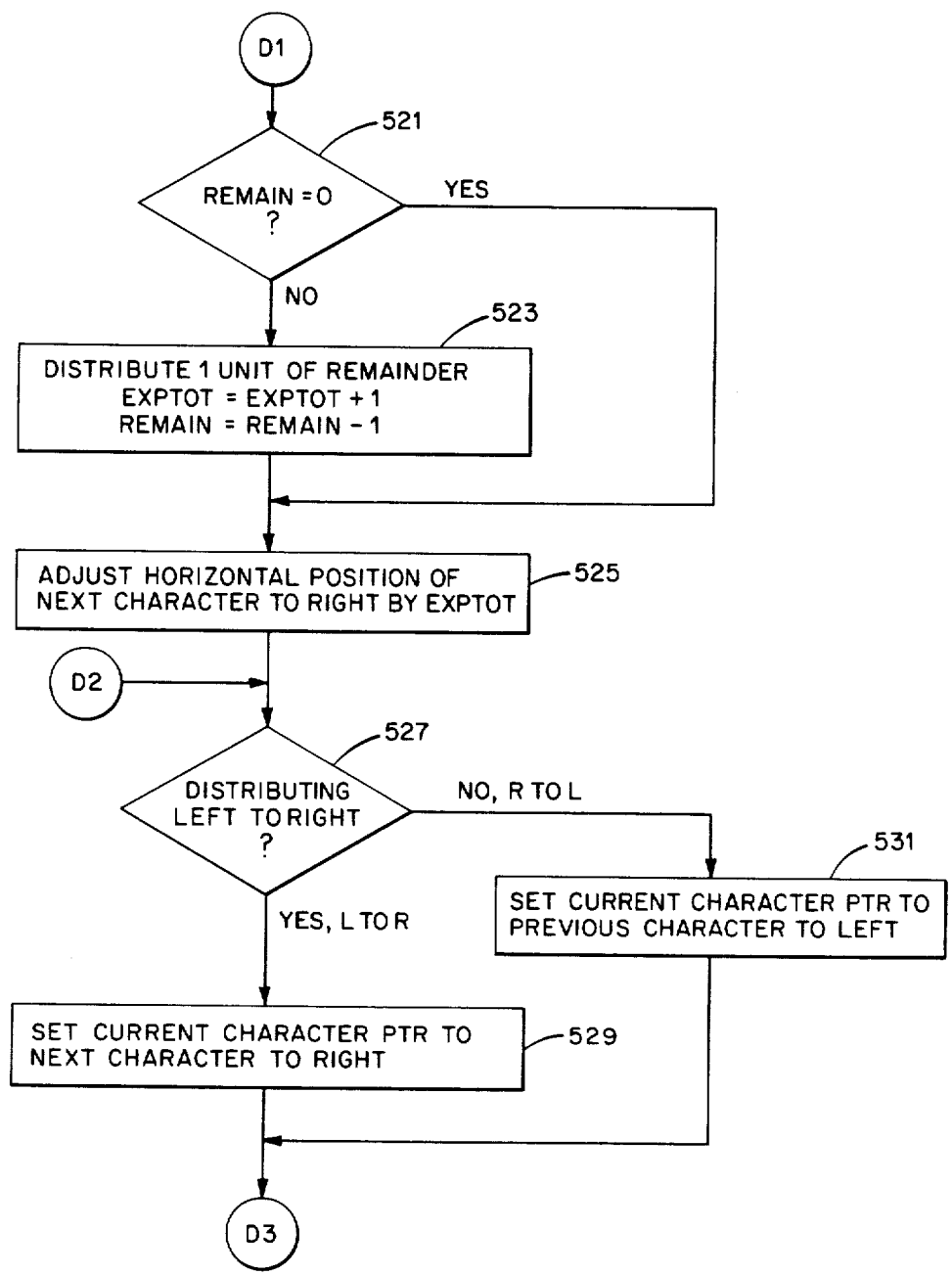
Fig. 5. (sheet 2 of 3)

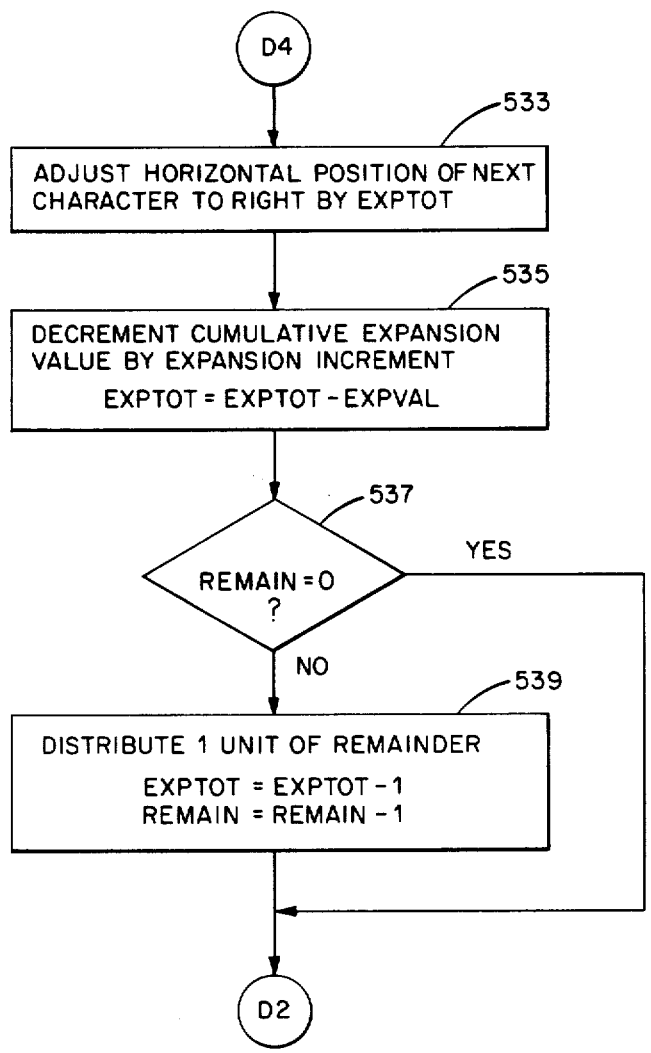
Fig. 5. (sheet 3 of 3)

WORD PROCESSING TEXT JUSTIFICATION METHOD

RELATED APPLICATIONS

The following patent application, which is assigned to the same assignee as the instant application, has related subject matter and is incorporated herein by reference: U.S. patent application entitled, "Word Processing Composite Character Processing Method", with inventor Robert M. Carosso, and having U.S. Pat. No. 4,749,989.

BACKGROUND OF THE INVENTION

1. Field of the Invention

The present invention deals with a method for performing word processing and particularly a method for performing justification of text within lines to be printed so as to produce uniform margins.

2. Description of the Prior Art

It is well known in the prior art to provide a word processing program of a word processor with the ability to perform right justification at the time that the text is printed. Right justification is an operation in which the words are positioned on each line to produce a document with a flush right margin in addition to a flush left margin. When right justification is used, it provides an even right margin such that lines of printed text are of equal length and do not end within an unequal number of spaces.

Current word processing programs have several problems with respect to the methods they use to perform justification in text. One problem is that the distribution of space between words so that the words completely fill a line to the right margin can result in the occurrence of rivers within the text. A river consists of the coinciding of gaps between words on consecutive lines of text which appear as a meandering white vertical line on a printed page. Although rivers can occur naturally by having the same length or approximately the same length words occurring in patterns within the text, the occurrence of rivers can be exasperated by the introduction of spaces between words at the beginning or ends of lines caused by the expansion of a line during justification. This expansion can cause these gaps to vertically, or more or less vertically, align.

A second problem that is encountered with current methods for doing text justification in word processing programs is that a separate justification routine may be required for each printer device on which the document is to be printed. For example, in a prior art word processing program capable of handling a line printer and a letter quality printer, three separate justification programs were required. One justification program was required to handle the line printer and a second justfication program was required to handle the letter quality printer operating within a fixed width character mode, and a third justification program was required to handle the letter quality printer operating in a proportional character mode. This problem of requiring multiple justification programs to handle multiple output devices can be compounded by the added complexity of attempting to distribute some of the expansion between words and some of it between characters within words.

Therefore, what is required is an improved justification method which will be independent of the output device on which the document is to be printed and which will minimize the occurrence of rivers within justified text.

OBJECTS OF THE INVENTION

Accordingly, it is an object of the present invention to provide a text justification method that is independent of the output device.

It is another object of the present invention to provide a text justification method that minimizes the occurrence of rivers caused by line expansion.

It is a yet further object of the present invention to provide a justification method that will expand lines of text by expanding between characters within words and by expanding the spaces between words to provide a more uniform expansion.

It is a further object of the present invention to provide a justification method that expands the text to produce an aesthetically pleasing line of text.

This invention is pointed out with particularity in the appended claims. An understanding of the above and further objects and advantages of this invention can be obtained by referring to the following description taken in conjunction with the drawings.

SUMMARY OF THE INVENTION

The present invention involves determining the number of expandable interword positions within the line of text to be justified, along with the number of expandable intercharacter positions within the line. The determination is then made to determine the amount of expansion required to produce a justified margin. The line contains both expandable intercharacter positions and expandable interword positions. A predetermined ratio is used to select the amount of intercharacter expansion which is to take place and that amount of expansion is then performed in the intercharacter positions. The interword positions are then expanded with any remainder being distributed in the interword positions, one unit at a time until the remainder is exhausted. If the number of expandable interword positions is equal to 0, any permissable expansion must occur in the intercharacter positions and a check is performed to see whether the intercharacter position expansion will exceed a limit and, if not, the total expansion is performed in the intercharacter positions distributing the remainder one unit at a time if its distribution will not be noticeable. If the amount of intercharacter expansion would define the predefined limit, then the intercharacter position expansion is set equal to the limit and the expansion performed in the intercharacter positions. This method uses granular units which allow the method to be independent of the particular output device which will be used to produce the printed text of the document. The justification method also alternates the distribution of any expansion remainder in order to reduce the occurrence of rivers in the text of the printed document.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 5 is a flow diagram of the expansion distribute routine used by the justification routine of FIG. 4.

DESCRIPTION OF THE PREFERRED EMBODIMENT

Modern word processors provide the user with a very powerful, yet easy to use tool. With it, an operator can create, revise, store and print any kind of typed communication or document.

HARDWARE CONFIGURATION

Figure 1:
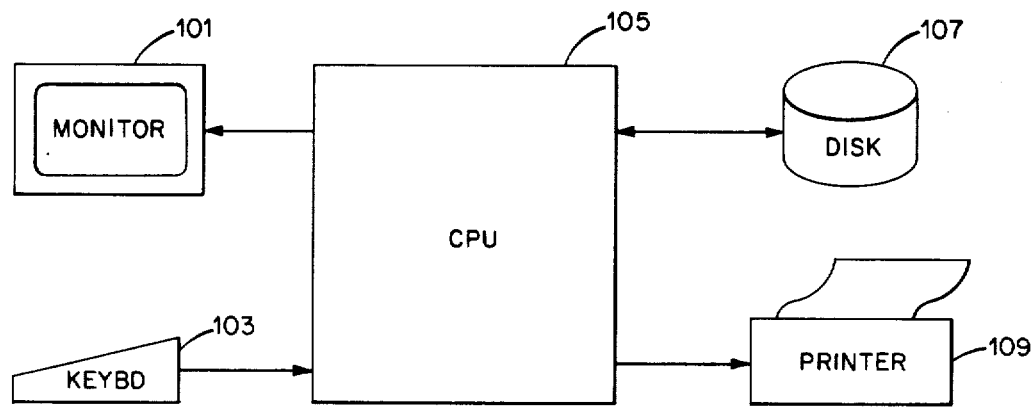
FIG. 1 is a diagram of a prior art hardware system capable of executing a word processing program.

FIG. 1 illustrates a typical prior art hardware configuration on which a word processing program containing the present invention can be executed. The hardware system of FIG. 1 can be a personal computer, a mini-computer, or a large mainframe computer without affecting the present invention. The hardware system of FIG. 1 can be used to create and print a document.

To create a document, the operator uses keyboard 103 which is similar to that of a typewriter. Each page of the document is displayed on a TV-like screen, or monitor 101, which allows the operator to see what is typed before transferring it to paper. If the operator makes a mistake, the operator can go back and type over it and need not use correction tape or eraser to correct the error. The word processing system automatically aligns all the text of the documents. When the text is exactly as desired, the word processing system is used to print the document on printer 109. Prior to printing, the document is maintained as a word processing file on disk 107 where it can be stored and printed at a later time if desired or revised and then printed. The word processing program itself executes in CPU 105 which contains both an arithmetic logic unit and main memory.

A typical word processing system will support a variety of printers. The word processing system of the preferred embodiment will support line printers, matrix printers and letter quality printers which allow the operator to choose different type faces for printing documents in ten, twelve, or fifteen pitch or proportionately spaced type. In addition, these printers can typically handle various sizes of paper, either single sheets or continuous forms and envelopes.

The typical word processing system offers a variety of operations and features for creating and controlling document entry and printing. The word processing system of the preferred embodiment guides the operator through the word processing operations through the use of menus. A menu displays a list of choices on monitor 101. The word processing system allows the operator to decide which operation is desired and lets the operator respond appropriately through use of keyboard 103. With these menus, the operator guides a document from initial creation and revision stages to the final printed copy. In the word processing system of the preferred embodiment, a print routine which employs the current invention, takes the word processing document stored on disk 107 and composes it prior to it being output on printer 109.

EDIT AND PRINT FUNCTIONS

The word processing system of the preferred embodiment can be broken into two basic functions, the edit function and the print function. The edit function is performed by the edit routine and the print function is performed by the print routine. When the edit routine is started, it displays a menu which allows the operator to initiate the creation, editing or revision of a document. When the print routine is started, it displays a menu which allows the operator to select various print functions.

In the preferred embodiment, each function on a menu is numbered. A blinking cursor is positioned in the selection field at the bottom of the menu. The cursor always shows the current location on the screen, whether the operation is making choices on a menu or just typing text. As the operator types, the cursor position indicates where the next character will be displayed on the screen (i.e., monitor 101). In the selection field on menus, the operator simply types the number of the function that the operator wants to perform.

Each time the operator displays a word processing menu, most of the answer fields that appear on the screen contain default answers. This saves the operator time that would otherwise be needed to fill in the fields. Each default is considered to be the most common user response to each answer field. The operator can accept the default answer or change it as necessary.

EDIT ROUTINE

The operator uses the edit routine to create or revise a document. A document is one or more pages of text to which the operator has given a name. The operator must name the document so that later when the operator wants to recall it for further editing or printing, the word processing system knows which document to retrieve.

A document summary is provided for each new document created on the system. The document summary is used to further identify the new document that the operator is about to type. Most of the answer fields in the document summary are preset with default values. These answer fields contain specific directions for the printing of documents. These answer fields may be changed at the time the document is created or revised when the printing of the document is initiated.

STATUS AND FORMAT LINES

In the word processing system of the preferred embodiment, there are two lines displayed at the top of the screen, which are the status and format lines. They are always displayed on the screen whenever the operator is typing or editing a document. The status line displays the name of the document that the operator is viewing and tells the operator where the cursor is located in the document, the page number, the line number and the column position on the line.

Below the status line is a format line. This line indicates where the operator has set the tabs and the line length for the text of the page much like is done on a typewriter. The format line determines the location of tabs, dectabs, and the right margin (with the right justification as needed), and specific line spacing for printing. The format line is displayed below the status line. The line spacing character indicates the spacing between lines with a 1 indicating single spacing and a 2 indicating double spacing, etc. The tab character indicates where tabs are set at various column positions. The right margin can be designated by a return character or the letter J. The letter J is used to specify right justification of the text below the format line during printing regardless of whether justification has been selected on the document summary or the print menu.

DOCUMENT FILES

Whenever a document is created using the word processing system of the preferred embodiment, a document file is created on disk 107. This document file contains three types of information. It contains document summary information which contains, among other things, information which is used to control the printing of the document by the print routine. It contains the text of the document itself which can include various imbedded format information within it indicating the indenting of lines, the superscript or subscript of various portions of the text, the centering of text, etc. The document file also contains format records (lines) which indicate the format which is to be used to align the text within pages.

FORMAT LINES

When the operator creates a document, a preset default format line is copied into the document file. This initial format line contains settings which are specified as the most common settings for the installation. However, the operator can change these formats to suit their particular needs for each of their documents. The operator can also create new format lines anywhere they desire in the text as they type or edit a document. Formats can be created between any two lines on a page or before the first line of a page. Any formatting changes made affect only the specific document to which they are associated. Changing a format line within the text affects only the text that follows that format line up to the next format line that is encountered within the text.

As indicated above, the format line allows the spacing of the document to be controlled. In the word processing system of the preferred embodiment, line spacing can be specified to be either quarter spacing, half spacing, no spacing (overstrike), single spacing, one and a half spacing, double spacing, or triple spacing. Line spacing also affects the document at the time it is printed. The display on the screen always appears single spaced.

The tab settings of the format line can be used to affect the horizontal position of the text within a line. The right marging setting within the format line can be used to set the desired column position of the right most character within a line. The format line can also be used to specify right justification which will be used to produce a flush right margin when the document is printed out. During printout, any text controlled by a format line containing the right justification indicator is printed with justified right and left margins. The format line can also be used to align columns of numbers or names by using the dectabs alignment character which can be either a decimal point, a comma or a colon.

The operator can create a new format line anywhere within the text of a document. For example, if the operator is typing a table that requires some special tab settings and would rather not change the settings of the current format line, the operator can create a new format for the table and when the table is finished create another format line to return to the original settings.

WORD WRAP

The word processing system of the preferred embodiment has a word wrap feature which allows the operator to continue typing without worrying about the end of the current line. As the operator reaches the end of a line, the system automatically moves the cursor and the word currently being typed (which does not fit on the line) to the left margin of the next line down.

REQUIRED SPACES

A required space is a special space character that is off limits to word wrap. The words or characters positioned on either side of the required space are not split up at the right margin by the word wrap feature. By typing required spaces, the operator can ensure that any two or more specific words (or characters) in the text stay on the same line. For example, the date Nov. 19, 1985 can be split by word wrap between "November" and "19". If the operator makes the space character between the two required, then word wrap can never split "November" and "19" onto two lines. If the operator wants to extend that protection to "1985", he types another required space between the comma and "1985".

When the expansion occurs during right justification, a required space is treated as though it were a normal non-space character. If the expansion is taking place between characters, the required space will be expanded along with the rest of the characters. If the expansion is taking place between words (i.e., on spaces), the required space will not be expanded at that time.

FORMATTING TEXT ON ENTRY

When typing text, the tab key on keyboard 103 can be used as on a typewriter. Each time the operator presses the tab key, a tab character is placed in the text and it appears on the screen at the time where it was typed. The cursor moves across the line to the next tab setting on the current format line. If the tab key is pressed when there is no tab stop remaining between the cursor position and the right margin, the tab character is positioned in the first column of the next line and the cursor moves to the first tab stop on that line. When entering text, the operator uses the center key to center text, such as headings and titles, on a line. The system calculates the center of the line using the margin specified in the format line. When the center key is pressed, the center character is placed in the text and appears on the screen. The end of the text which is to be centered within the margins is specified by using the return key.

When typing columns of numbers, the dectab key is used by the operator to line up the decimal tab character if, for example, decimal points are used. Decimal points are aligned with the appropriate tab settings in the format line. If a number has no decimal point, the system assumes that the decimal point exists to the right of the number and lines up the number as if a decimal point were actually typed.

When entering text, the operator uses the super-sub key to indicate where in the text a superscript or subscript is to be printed. The superscript and the subscript characters are typed and appear in the text on the screen at the point where the operation is to occur. These are used to instruct the printer to move up or down one-third of a line from the current line being printed and thus creates superscript or subscript in the printed document. Each instance of a superscripted text must be followed by a subscript character and vice versa. This insures that the remaining text returns to the main printing line. Text is superscripted or subscripted only during printing and is not displayed as such on the screen. Typing consecutive subscript characters on the screen moves the printer up on the paper one third of a line. For each superscript character typed, the text must be followed by the same number of subscript characters.

MULTICOLUMN PRINTING

The word processing system of the preferred embodiment allows multiple column printing to be done. Multiple column printing allows the operator to print two or more columns of text side-by-side on one printed page. When a document is printed in multicolumn format, each page of the document becomes one column on a printed page. Any document can be printed in a multicolumn format. However, the multicolumn effect is achieved by placing two or more document (logical) pages on one printed (physical) page. For example, if an operator prints pages 1 through 4 of a document in two column format, only two sheets of paper are actually printed. Pages 1 and 2 of the document are printed on the first dual-column page (page 1 is the left column, and page 1 is the right column). Pages 3 and 4 of the document are printed on the second dual-column page (page 3 is the left column, and page 4 is the right column).

If the right margin in the format line on each page of the document is not adjusted (made narrow) to fit, the results can be unpredictable. A document must therefore be set up accordingly before it is printed on multicolumn pages. The operator must observe the following rules when preparing a document for multicolumn printing:

1. Set the right margins in the format line to the width of the column. Each page of the document is only one column on the actual printed page.

2. The number of lines on each page of the document does not have to be the same. During multicolumn printing, when a page character is encountered in one column (logical page), nothing more is printed in that column. Other columns continue to print. When the page character is encountered in the longest column, then the printing of that multicolumn page is completed, and the next multicolumn page starts to print.

3. The format line that controls a particular page in a document also controls the format of that corresponding column.

4. The printing of multicolumn pages can be intermixed with single column pages. This can be done by widening the right margin in the format line in the page representing the leftmost column and making the pages representing the other columns blank.

5. The width of header and footer pages should match the paper width.

A paragraph and alignment feature allows the operator to type special codes in a document that is to be multicolumn printed so that, when the document is printed, paragraphs or other blocks of text are aligned horizontally on the page.

HEADERS AND FOOTERS

Depending upon the type of document, there is often a need for standard information to be produced at the top or bottom of each printed page. By using headers and footers, the operator can automatically print out on every page, or on selected consecutive pages of a document such information as: chapter or section titles, slugs, proprietary notices, and page numbers. The word processing system of the preferred embodiment allows one header and one footer per document.

FOOTNOTES

The word processing system of the preferred embodiment has a feature which eliminates the need for typing footnotes at the bottom of the pages as they are referenced. Instead, they are all typed on a separate reference page and the footnotes are automatically printed at the bottom of the correct page during printing. A footnote reference can consist of one to three alphanumeric characters which identify the text to be footnoted. When the document is printed, the footnote references and the identifiers of the footnote text are printed as numbers.

OTHER PRINT OPTIONS

In addition to the commands which allow the operator to control the printing of the document in multicolumn format, there are special key sequences available for use when the document is being entered that appear as format information in the document text to call special printing of characters during the print operation. These special print options include bold printing which causes each character to be printed twice to cause a dark appearance, offset printing which causes shadow printing in which a character is printed twice in slightly offset positions, overstrike which causes a slash character to be printed over any character, and underscore which is a quick way to underline any existing text so that the operator does not have to do it manually.

PRINT ROUTINE

Once the operator has created a document or edited an existing document, the operator can exit the edit routine and enter the print routine to print the document.

When a document has been created, such that a word processing file exists in disk 107, the operator may initiate the printing of the document on printer 109 by use of the print routine of the word processing system. Depending upon the particular equipment available at the word processing site, the operator may print out the document on either a letter quality printer, a high speed line printer, or a matrix printer.

PRINT MENU

When the print operation is initiated, a print menu is displayed on monitor 101 which allows the operator to tailor the print instructions to the specific needs of the document to be printed. The print menu allows the operator to specify the following information: printer to be used, number of copies of each page, page numbers where the text page printing is to begin and end, page number where envelope printing is to begin and end, the number of columns, the left column margins, the first page number for page number printing, paper length, header and footer printing locations, starting number of consecutive footnote printing, pitch (10, 12 or 15 character per inch), paper feed selection, lines-per-inch selection, right justification, draft copy printing, print notes typed in text, print the document summary, and merge printing. The name of the document file to be printed appears at the top of the print menu. The fields in the print menu contain default values that allow the operator to accept the print menu screen as is, or to change the above list of parameters.

PRINT ROUTINE FLOW

The general flow of the print routine is that of input-process-output. First, the print routine accepts the document text and information about the text from the word processing file stored on disk 107. Second, the print routine converts the text to a canonical, or standard, form so that it can be processed by the same internal processing routine independent of the text source and output destinations, i.e., the particular printer type on which it is to be printed. Finally, the print routine passes the fully processed canonical form to an appropriate destination-dependent output routine design to quickly convert the canonical form to the form required by the particular output device (printer).

The main routines of the print program illustrated in FIG. 2 that control the general flow through the print program are as follows: general initialization, initialize with printer profile, initialize character mapping tables, generating form feed, document summary print, copy loop, merge print, output routines, clean up and exit with status routine.

During general initialization, various error and status indicators are initialized and the input file and output device are initialized. The input file specifies which word processing document is to be printed and the output device specifies on which output device the document is to be printed on. The input file and the output device are determined by interaction with the operator through use of the print menu. Once the output device is determined, the character mapping tables (CMT) for the particular printer to be used can be loaded from a character mapping file. Character mapping files contain tables for each of the various printers available within this system. During initialization, a print control block (PCB) is built which is used by the print routine to control the printing of the document. Some of the information in the print control block, which is shown in Table 1, is obtained from the document summary contained within the word processing file created when the document was typed into the system. This information can be changed if desired by the operator through the use of the print menu.

TABLE 1

Print Control Block (PCB)

Logical Resource Number (LRN) of Output Device
Number of Copies
Number of Columns
First Page to Print
Last Page to Print
Last Merge Page
First Envelope Page to Print
Last Envelope Page to Print
Total Number of Pages in Document
Total Merge Pages
Starting Page Number
Columns Left Margin Array
Paper Length
Header Begins on Page
Header Begins on Line
Footer Begins on Page
Footer Begins on Line
Starting Footnote Number
Horizontal Motion Index (HMI)
Vertical Motion Index (VMI)
Printer Type
Feeder Sequence
Font
Proportional Print Flag
Right Justification Flag
Draft Copy Flag
Print Notes Flag
Print Document Summary Flag
Merge Printing Flag
Records Processing Form Document Flag
Records Processing List Document Exists Flag
Abbreviations Document Flag
Word Processing Temporary Document Flag

PRINT MENU

The various parameters within the print control block can be changed by the operator through use of the print menu. The entries within the print menu of the preferred embodiment allow the operator to specify the following:

NAME OF PRINT QUEUE

There is a specific queue name assigned to each of the printers within a word processing system. The default print queue is defined during operator registration. The name of print queue field specifies the queue (output device) where the document is to be printed. The operator can change the default print queue by overstriking it with the name of another valid print queue. The document to be printed may wait in line if other documents are currently queued to the same output device.

NUMBER OF COPIES

This field indicates the number of copies that the operator wants to be printed for each page of the document that was specified to be printed. The operator can request from 1 to 63 copies.

TEXT PRINTING IS FROM PAGE

This three digit field specifies the page number in the document where printing is to begin and end. If the operator specified printing from page 0 through page 999, all the pages are to be printed. If the operator specifies the printing from page 3 through 3, for example, only page 3 is printed.

ENVELOPE PRINTING IS FROM PAGE

This three digit field specifies the envelope page numbers where printing is to begin and end, as in the case of text printing.

NUMBER OF COLUMNS

This field allows the operator to specify the number of columns (actually, the number of document pages) to be printed on the same page. Up to nine columns can be specified.

LEFT MARGIN SETTINGS

These values designate the distance from the left edge of the paper and the point where each column will begin on the printed page. Up to nine left margin fields can be specified. This permits the operator to print up to nine columns on a page and specify where each of the columns is to begin.

FIRST PAGE NUMBER

This field is used for automatic page numbering. It specifies the page numbering with which the system should start numbering the pages in the footer and/or header.

PAPER LENGTH (NO. OF LINES)

This value specifies the size of the paper on which the document is to be printed. The printer types six single-space lines per inch (66 lines per 11-inch page) or eight lines per inch (88 lines per 11-inch page).

HEADER BEGINS ON PAGE/FOOTER BEGINS ON PAGE

These fields specify the first page of the document where the header and/or footer should be printed and the line where it should begin on each page.

BEGINNING FOOTER NUMBER

This field allows the operator to specify a starting footnote number for sequentially numbered footnotes throughout the document.

PITCH

One indicates ten characters per inch, 2 indicates 12 characters per inch, and 3 indicates 15 characters per inch.

PAPER FEED SEQUENCE

Typing an S-response in this field stops the printer after each page is printed and allows the operator to insert a new sheet of paper. The S-response is used for manual single-sheet feeding printers. Typing a C in this field informs the printer that it is to continue printing pages on a continuous form of paper, or from a cut-sheet feeder. The following responses (L, 1, and 2) in this field refer to dual or triple pocket paper feeders which feed single sheets of paper one at a time without stopping, from one to two pockets. An L-response instructs the system to feed the first page from pocket one and the remaining pages from pocket 2. A 1-response instructs the system to feed from the back pocket and a 2-response instructs the system to feed from the front pocket.

LINES PER INCH (6 OR 8)

This field permits the operator to specify the number of lines to be printed for every inch of paper.

JUSTIFY RIGHT

When the operator specifies right justification, the words are spaced on each line to produce a document with a flush right margin, in addition to a flush left margin. With the right justify option, if the last line of a page is terminated with a page character (not a return), that line is justified (spaced out) to the margin. Any lines of text below a format line indicating right justification are right justified during printing whether justify right has been selected or not in the print menu.

DRAFT COPY

This field allows the operator to have a document printed as a draft or final copy. If the operator selects draft copy, the line spacing indicated on the format line of the document is doubled. For example, a format line specifying single spacing prints out double spaced as a draft copy.

PRINT NOTES

This field indicates whether or not the printout will include the notes typed in the document.

PRINT DOCUMENT SUMMARY

This field specifies whether or not the operator wants a copy of the document summary to be printed along with the document.

ENTER MERGE DOCUMENT NAME

When merge printing a form document, this field is used to specify the name of the merge document to be used. Merge printing allows the operator to perform repetitive letter writing automatically. To do this, the operator creates two documents to be "merged" when printed by typing a standard form letter once. This is called the form document. Then, all the names, addresses, and other variable information are typed into a document called the merge document. If the installation has the capability to print envelope pages, the operator can also merge print addresses on the envelopes. When these two documents are merge printed, the variable information is inserted into the form document. The form document prints out repeatedly, until all the variable information in the merge document has been used.

PRINT ROUTINE FLOW

Figure 2:
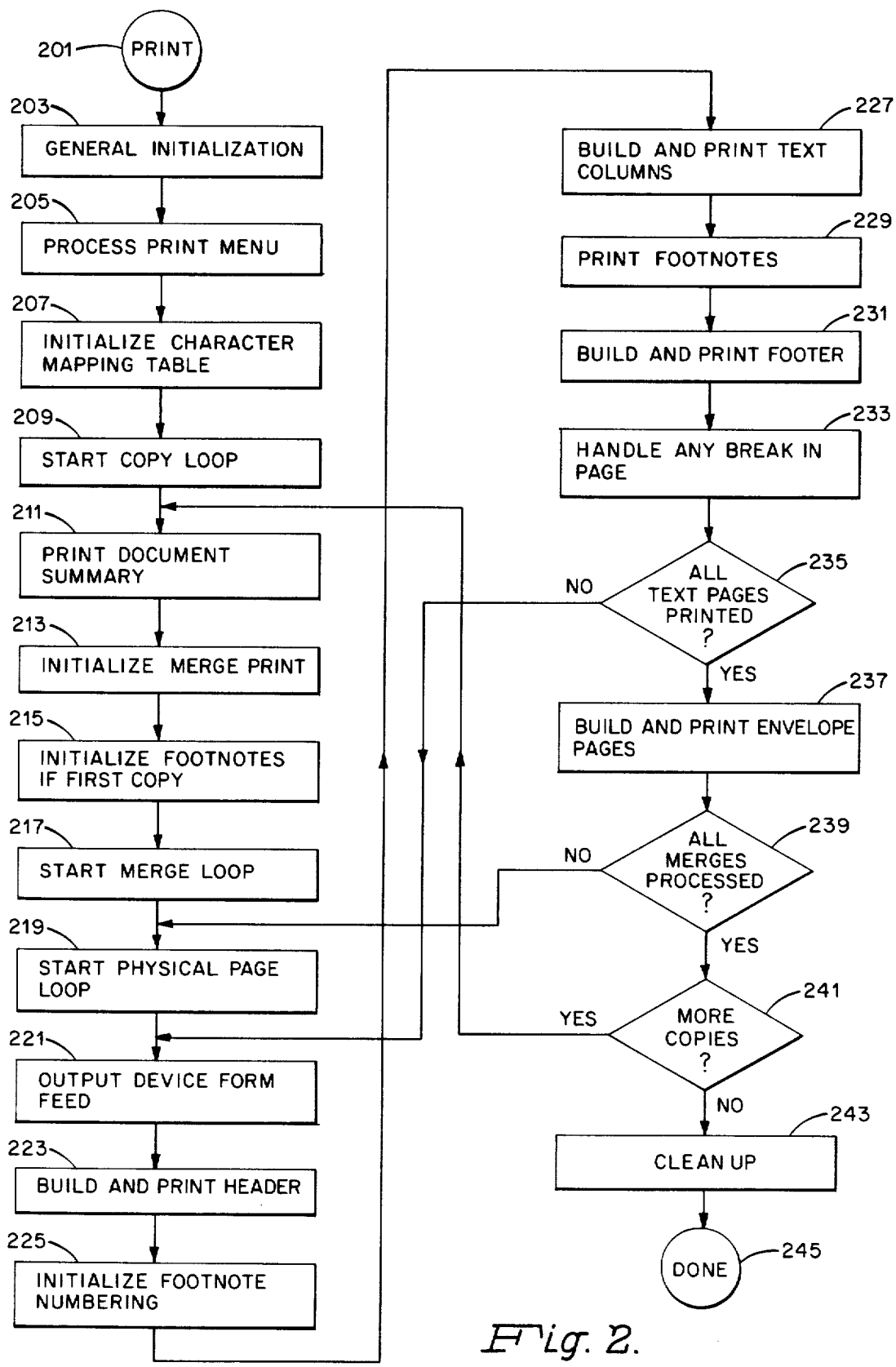
FIG. 2 is a a flow diagram of the print routine of a word processing program.

A gross level block diagram flow chart of the print routine is shown in FIG. 2. The print routine is entered in block 201 After being called by the word processing system with a pointer to the word processing file which is to be processed. Block 201 exits to block 203 which performs general initialization of the print routine.

In block 203, various initialization is performed setting up data structures and opening access to the word processing file. This initialization also includes setting up the program control block (PCB) which is shown in Table 1 with parameters from the document summary and print summary records within the word processing file of the document to the processed.

Block 205 is then entered to process the print menu. Through interaction with the print menu, the operator can specify or change various parameters which will be used to print out the word processing document. In block 205 a check is performed to see whether a merge document is being printed and, if so, the merge file is opened and the summary records read. A similar check is performed to see whether envelope pages are to be printed and, if so, the relevant entries in the PCB are set up. At this time, the various operations associated with initializing the output device are also performed. These parameters initialization functions include making decisions with respect to feeder sequence, proportional print and type font and the results are saved in the print control block for later use.

The print control block shown in Table 1 is initialized with information from the word processing document file that is to be printed and which with parameters from the operator entries in the print menu, contains most of the information that is used to govern printing, such as the font, left margins, the number of columns, what pages to print, pitch, lines per inch, type of document, etc. Once initialized, most of the information in the PCB remains unchanged during the printing of a document.

Two important parameters found in the PCB are the horizontal motion index and the vertical motion index. The horizontal motion index (HMI) and vertical motion index (VMI) are calculated in block 205 for later use in converting paper length, header line, footer line, and left margin to granular units.

A granular unit is defined as the smallest horizontal or vertical distance that the output devices printhead or other output medium can move under software control. The HMI is defined as the number of horizontal granular units in the width of a standard character of the particular output device. The VMI is defined as the number of vertical granular units in the height of a standard line for the particular output device. Both the HMI and VMI are stored in the PCB and readily available for use by the print routine.

Printer granularity units are used because they are the only units common to all printers and thus permits subroutines within the print routine to be independent of the particular printer on which the document will be printed. In the preferred embodiment, the line printer has a horizontal granularity of 1/10 of an inch and a vertical granularity of 1/6 of an inch. A matrix printer has a horizontal granularity of 1/15 of an inch when used in the 15 pitch mode, 1/12 of an inch when used in 12 pitch mode, 1/10 of an inch when used in the 10 pitch mode, and a vertical granularity of 1/48 of an inch. A letter quality printer has a granularity of 1/120 of an inch when used in either proportional or non-proportional mode and independent of the pitch, and has a vertical granularity of 1/48 of an inch. Printers with fine granularity produce higher quality output than printers with coarse granularity. This is because there are more possible places to put characters on the paper and thus functions (such as right justification, centering and outputting composite characters), and vertical positioning functions (such as superscripting, subscripting and outputting composite characters) can be done more accurately. A composite character is a character produced by multistriking two or more characters in the same character space with possibly some horizontal or vertical offset between character strikes.

A device information block (DIB) is also built at this time in clock 205. The DIB contains information specific for the output printer. Such things as the current position on the page (vertical and horizontal), a list of lines that have been queued to the device but not yet printed, the maximum vertical position attainable on the printer (may change with different feeder/paper configurations), the number of pages passed since the last write, the number of writes done, and various flags. An INIT flag indicates if the device has been initialized, a TFED flag indicates if there is a paper under the printhead, a RECON flag indicates that the device has just been reconnected, a YESREC flag indicates that it is allowable to reconnect this device more than once, a SHFT flag indicates if the printer is in the shift out state and an ENDFLI flag indicates if an end of file has been encountered.

Figure 6:
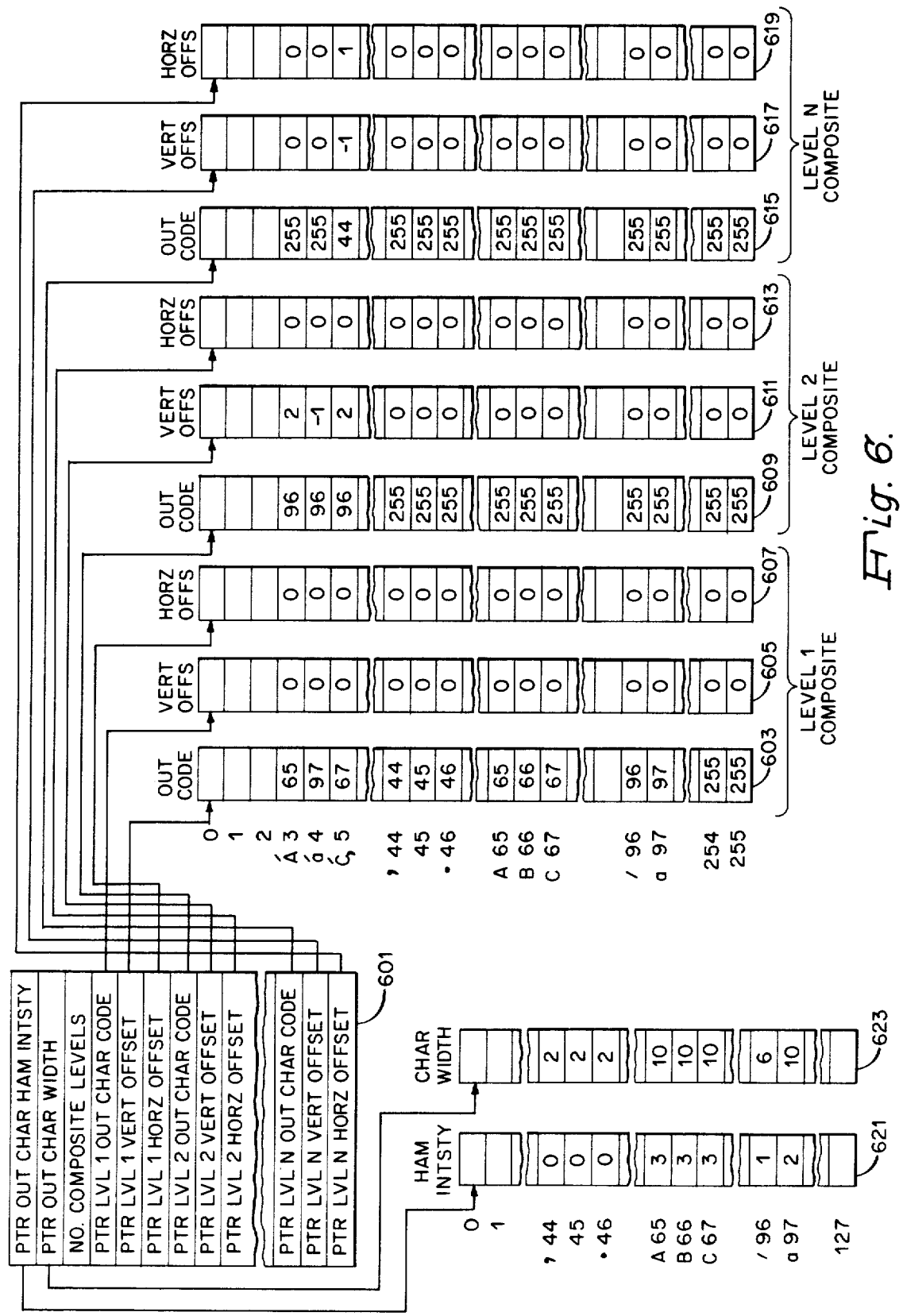
FIG. 6 is a block diagram of the character mapping table used by the print routine of FIG. 2.

Block 207 initializes the character mapping tables (CMT). The character mapping tables, an example of which is shown in FIG. 6, are created and loaded from a charcter mapping file. There is one character mapping file per font per printer. The character mapping table is used to translate the encoded text characters from their representation as stored in the document file to the character codes which are required to activate the corresponding character graphic on the particular output device which is to be used to print the document. The name of the font, as well as the printer type, is obtained from the print control block. The character mapping files are created by a utility program which reads charcter mapping documents in an easy to use word processing document format and translates them into tables that the print program can access more directly. In takes hundreds of reads of records for the utility program to process the character mapping documents, but only several reads of the character mapping file to load the character mapping tables. Thus, by performing this function external to the print routine, the majority of processing is done once per font instead of once per printed document.

The character mapping tables as shown in FIG. 6 consist of two groups of tables. The first table group maps the internal document character code to the printer output character code, the vertical offset, and the horizontal offset in which the character is to be printed. The second table group maps the output character code to a hammer intensity and output character width. The character mapping tables provide that a single character within a document which is entered by the edit routine can result in the printing of multiple characters in the printed document by use of composite characters in which there is one character printed for each level of composite within the character. As will be seen below in greater detail, a character which is encoded within the document as a letter A with an accent over it may be printed out by first printing the character A and then printing the accent above it, with the accent vertically offset depending upon whether it is printed over an upper case or a lower case A.

As seen in FIG. 6, there are three tables for each composite character level defined in the font. The document character to printer output character mapping table (tables 603, 609 and 615) translates the character code used to specify the character entered by the operator to the character code recognized by the particular printer to produce the desired graphic. The second table for each composite character level (tables 605, 611 and 617) is the optional character vertical offset mapping table which, if present, indicates the vertical offset the printhead is to be moved up or down before printing the desired graphic. The third table for each composite character level (tables 607, 613 and 619) is the optional character horizontal offset mapping table which, if present, indicates the horizontal offset the printhead is to be moved left or right before printing the desired graphic.

FIG. 6 shows character mapping table pointer block 601 specifying three levels of composite. Level 1 has output character code table 603, vertical offset table 605 and horizontal offset table 607. Level 2 has output character code table 601, vertical offset table 611 and horizontal offset table 613. Level N has output character table 615, vertical offset table 617 and horizontal offset table 619. The example character mapping table illustrated in FIG. 6 has the capability of mapping keyboard codes from 0 to 254 to an output character with character code 255 being reserved for indicating that the keyboard code is to be mapped to no character. For example, this 255 code is used in entry 254 in table 603 to indicate that keyboard code 254 will not print a character. This 255 code is also used in composite levels 2 through N to indicate that no composite character exists at that level. For example, keyboard code 44, which is an ASCII comma, does not have a composite in level 2 (table 609) or level N (table 615), whereas code 4 has a composite in level 2 (table 609) but does not have a composite in level N (table 615), and whereas keyboard code 5 has an entry at both level 2 (table 609) and level N (table 617).

If the particular output device being used to print the document has a regular character set and a shift-out character set, a bit within the output character code table can be used to indicate whether it is a regular character or a shift-out character. If the particular output device being used to print the document does not have the ability to do vertical offset, the vertical offset table may not be present. Similarly, if the particular output device does not have the ability to do horizontal offset, the horizontal offset table may not be present.

The CMT pointer block, in addition to pointing to the character-to-character mapping tables specifying the output codes and the vertical and horizontal offsets, also points to the output character code tables which include a table which specifies the hammer intensity at which the output character is to be struck and the width of the output character.

The process for translating the character code from the code stored within the word processing document to the code used by the printer consists of first using the document (keyboard) character code as an index into the output character code table, the output character vertical offset table and the output character horizontal offset table, to retrieve the output character code, the vertical offset and the horizontal offset for a composite level. The output character code can then be used to index into the output character hammer intensity table (table 621) to retrieve the intensity at which the output character is to be struck, and also used as the index into the output character width table (table 623) to retrieve the width of the output character. This process is repeated for each composite level existing for the document code.

For example, if the document code of 5, which is used to represent an uppercase letter C with an accent over it and a comma under it will result in an output code of 67 from table 603, a vertical offset of 0 from table 605 and a horizontal offset of 0 from table 607 for composite level 1 which, when the output character code is used as an index into hammer intensity table 621, results in a hammer intensity of 3 and a character width of 10 granular units from table 623, composite level 2 will result in output character code 96 (an accent from table 609, a vertical offset of 2 from table 611 and a horizontal offset of 0 from table 613) a hammer intensity of 1 and a character width of 6. Composite level N will result in output character code 44 (a comma) with vertical offset −1 and horizontal offset 1, a hammer intensity of 0 and a character width of 2.

The document code gets translated and the information retrieved from each composite level is stored in a character record (CR) which becomes a double linked list of characters. The information contained in the character record is specified in Table 2.

TABLE 2

Column Information Block (CIB)

Pointer to Next CIB
Column Hammer
Logical Page Number
Page Record Key
Pointer to Current Text Record
Offset into Current Text Record
Pointer to Current Format Record (line width, tab stops, what current line spacing is)
Pointer to Beginning of Character List
Pointer to Most Recent Wrap Point Character Record
Pointer to End of Character List
Current Vertical Position
Current Horizontal Position
Underlining Flag
Bold Print Flag
Shadow Print Flag
Overstriking Flag
End of Logical Line Flag
Paragraph Align Wait Flag
End of Logical Page Flag A character record in a character chain contains a pointer to the next character record in the chain except for the last character record in the chain which points forward to NIL. A character record also contains a pointer to the previous character record in the chain except for the first character record in the chain which points to NIL. A character record contains the vertical position of the character relative to the main line, the current horizontal position of the character relative to the left margin, any vertical offset that was obtained from the character mapping tables, and any horizontal offset that was obtained from the character mapping tables.

The output character itself is stored in the character record along with the character set (e.g., a regular character or a shift out character). A character record contains a flag indicating that it has wrap points. If this flag is true (set or on), then the line may be broken at this character; and that character and all of the characters after it may be wrapped to the new beginning of the next line.

If a stop character was encountered in the document just before this character, then the stop flag would be true and the routines will direct the printer to stop prior to printing this character.

The character record contains the justify flag which, if set to true, means that this character can be expanded for right justification. If the character itself is a space and the required flag is on, then this means that the character is to be treated as if it were a normal non-space character for purposes of right justification and word wrap, rather than being treated as a space.

If character has a composite flag, then it is a non-primary component of a composite character. If the underline, bold print, shadow print or overstrike flags are on, then these attributes are to be applied to this current character. In addition, if the continue underline to next character flag is on, then any gap in the line between this character and the next character should also be underlined.

Block 209 is entered to start the printing of a first copy of the word processing document. After initializing variables which control the printing of the copies from the PCB the copy loop begins.

Block 211 prints a document summary, if requested by the operator. The document summary pages are printed once per copy. The information to be printed in the document summary is read from the summary records stored within the word processing document.

Block 213 initializes for merge printing. This initialization consists of initializing data structures needed for implementing records processing during merge printing.

Block 215 does initialization necessary to print footnotes. This initialization occurs only during the printing of the first copy of the document.

Block 217 starts the merge printing loop. In block 217, information from the column information blocks necessary for merge printing, such as the record key and index for the merge document, are stored in the data structures called RIBs. At the start of each form, the information from the RIB is entered into the column information block (CIB) described below. At the top of each page, the CIB information is saved in the RIB. Then, if a break is encountered, the CIBs are restored from the RIBs to get back to the right place in the merge document.

Block 219 is the start of the physical page loop. This block performs the initialization required to control the printing of one physical page on the printer.

In block 221, the form feed is performed. Form feeds are sent to the printer and, if there is a two of three tray feeder on the printer, the appropriate command sequence is sent before the form feed to select the proper tray. The initialization of the printer is done before the first form feed, or before the form feed following a break. Some printers require that left margin, pitch and lines per inch and selectable fonts also be initialized at this time.

Block 223 builds and prints the header within the page by use of the column build routine shown in FIG. 3 and described below.

Block 225 initializes the footnote number before starting the printing of any column of text within the page.

Figure 3:
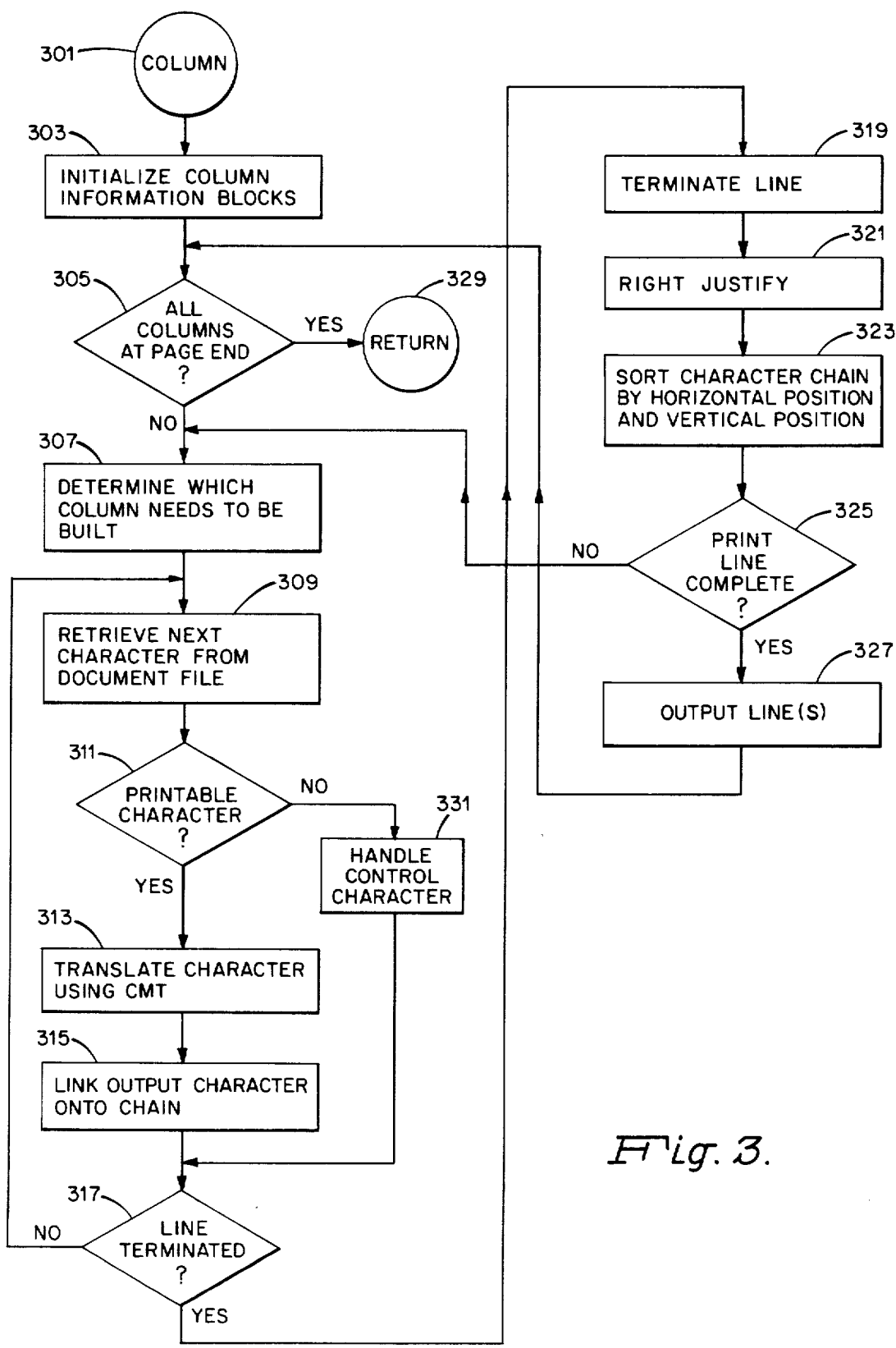
FIG. 3 is a flow diagram of the column routine used by the print routine of FIG. 3

Block 227 builds and prints the text columns using the column build routine of FIG. 3.

Block 229 prints any footnotes which have accumulated during the printing of the text page.

Block 231 builds and prints the page footer using the column build routine of FIG. 3.

Block 233 handles any breaks within the page caused by an interruption of the printing operation by the operator or device error, such as, an output of paper or out of ribbon indication.

Block 235 then checks to see whether all text pages have been printed and, if not, returns to block 221 to print the next page of text. If all text pages have been printed, block 237 is entered to build and print envelope pages.

Block 239 is then entered to determine whehter all merge printing is done and, if not, returns to block 219 to print the next merge document. If all merge printing has been completed, block 241 is entered to see whether all copies have been printed and, if more copies are required, returns to block 211 to start the printing of the next copy of the document. If all copies have been printed, block 243 is entered and print routine clean up is done by exiting to block 245 which completes the print routine.

COLUMN ROUTINE

FIG. 3 illustrates the column building and printing routine of the preferred embodiment. The column routine builds a logical line by making calls to the character retriever to get a character form the text input source and then calls a character processor to either store the printable character or take appropriate action if it is a control character. When printing a multicolumn document, the column builder must be called several times to produce multiple logical lines so that the total printed line across the page can be completed before it is physically output to the printer.

The routine is entered in block 301. Block 303 is then entered to initialize the column information blocks (CIB) for that portion of the physical page being currently printed. The CIB is a data structure that contains all the pertinent context associated with a logical page, such as a text page, envelope page, header or footer pages, etc. The contents of the column information block are shown in Table 3.

TABLE 3

Character Record (CR)

Figure 7:
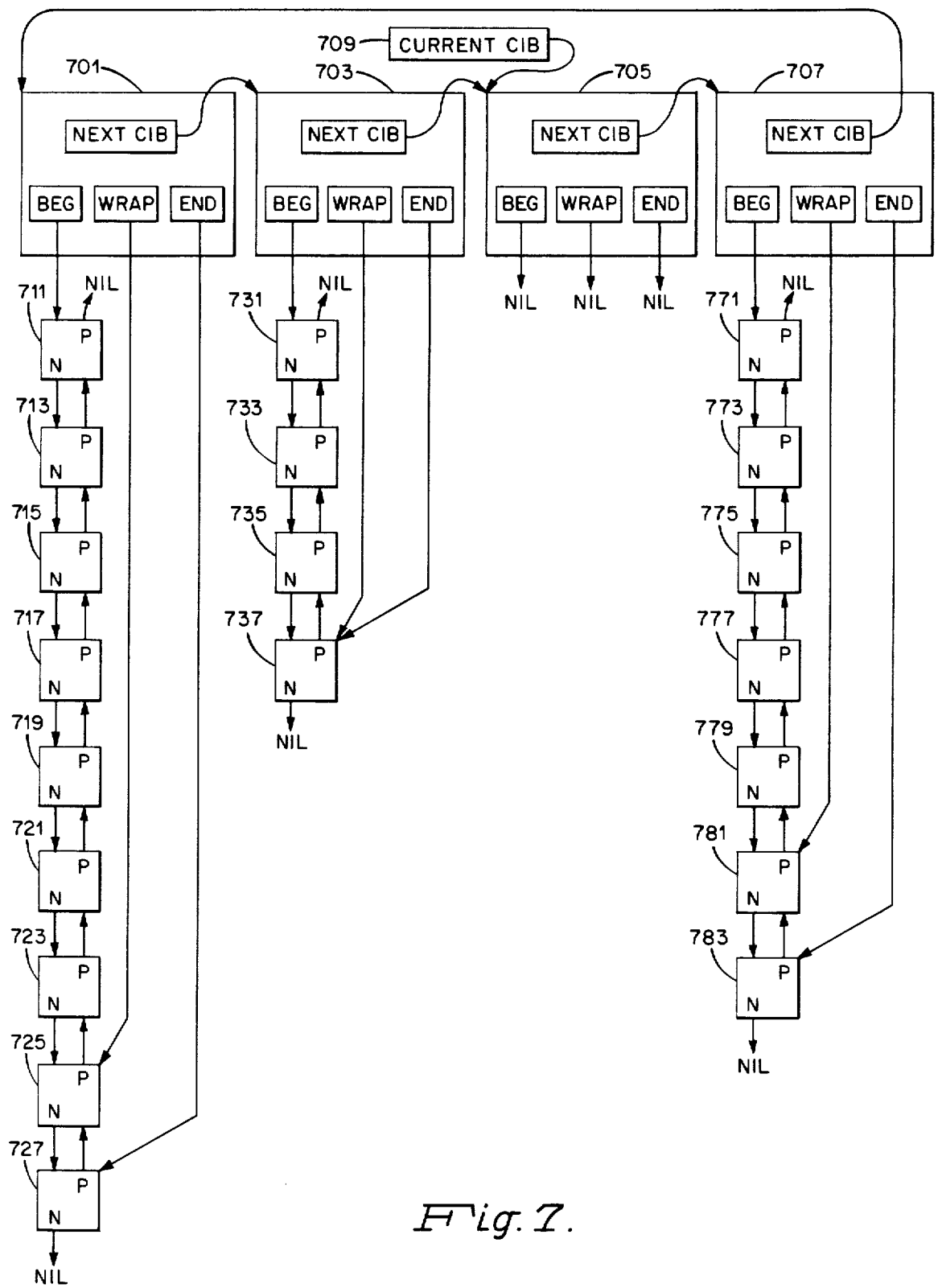
FIG. 7 is a block diagram of chained column information blocks (CIB) used by the print routine of FIG. 2.

Pointer to Next Character Record
Pointer to Previous Character Record
Vertical Position
Horizontal Position
Vertical Offset
Horizontal Offset
Character Output Code
Character Set (e.g., regular or shift out)
Wrap Point Flag
Stop Flag
Justify Flag
Required Flag
Composite Flag
Underline Flag
Continue Underline to Next Character Flag
Bold Printed Flag
Shadow Printed Flag
Overstruck Flag For multicolumn print, multiple CIBs are linked in a ring which can be traversed to gain access to the context of each logical page (column) that is comprising the text portion of the current physical page. Thus, the column builder can be called to construct a line in one column, called again to construct a line in another column, and always be able to continue where it left off in a given column. For header, footer and single column text pages, there is only one CIB and it points to itself. FIG. 7 illustrates four linked CIBs as they would appear during the printing of a four column portion of a physical page.

In block 305, a check is made to determine whether all columns are at the end of the page and, if so, a return is made in block 39. If all columns are not at the end of the page, then block 307 is entered and a determination is made as to which column needs to be built. Once it is determined which column needs to be built, block 309 is entered to begin building a column. In block 309, the next character from the document input buffer is retrieved.

Block 309 retrieves a character from the text of the document file by using pointers to the document file stored in the column information block. The CIB contains pointers to the input buffers that contain the current text and the records read from the input document. It also has a pointer to the input buffer that contains the current text record from the merge document, if merge printing. It has the current indices to any text record buffers being used and all associated record keys and page numbers. It checks the record buffer pointer for NIL. It checks the indexing into the record to see if every character from that record has already been retrieved and a new record needs to be read. It updates pointers to the current character in the buffer and, when necessary, handles the transitions between records.

Input text characters are normally retrieved from the text buffers from a text page that is traversed forward from its beginning to the end. There are other cases, though, when character receieving must be handled specially, such as when text comes from a footnote reference page or a dummy buffer containing the text string of a page or footnote number or document summary messages. In all cases, a buffer identical to that for the normal case is created for this use and is set up appropriately for text length, etc. This minimizes the number of checks that occur on a character-by-character basis and exception code is executed only when the current record is exhausted and a new one is needed.

After the character is retrieved, block 311 is entered to determine the manner in which the retrieved character must be processed. If the character retrieved from the text of the document filed is a printable character, block 313 is entered. If the character retrieved from the document file is not a printable character, block 331 is entered to do any special handling required. Block 331 handles special characters which indicate horizontal positioning functions such as tab, dectab, center or indent and vertical positioning functions, such as superscript or subscript, as well as note, hide sequences, and column alignment functions.

A horizontal positioning function is defined as a tab, a dectab, center or indent. The sequence of events for handling horizontal positioning functions is generally as follows. A flag is set in the CIB to indicate that a horizontal poisitoning function has been encountered and processing continues. Then, if the next character retrieved from the document file is another horizontal positioning function, the previous horizontal poisitioning function is terminated appropriately and the new horizontal positioning function flag in the CIB is set. If the next character is a printable character, the horizontal position function flag in the CIB is reset and the CIB pointer is pointed to that character's character record (CR). If the horizontal positioning function required adjustment of the horizontal position, such as a tab, then this is done as well. Finally, if the horizontal positioning function was the last wrap point on the line, word wrap occurs using that pointer as the place to break the line. Horizontal position functions that fail due to the lack of valid tab stops, center marks after text, or other centered column heading that failed can cause a line to be terminated and queued or to be terminated as though by a carriage return.

When a vertical position function, such as a superscript or subscript character, is encountered the current vertical position in the CIB is adjusted appropriately. When a character indicating paragraph alignment is encountered, the wait flag in the CIB is set to indicate that the processing in this column should wait until the wait flag has been turned on in each of the CIBs associated with the other columns or until a page break character has been encountered in each of the other columns. After handling the special characters, block 331 exists to block 317.

Block 313 is entered whenever a printable character is encountered in the document file. Block 313 translates the printable input text character from the document file into the output character code associated with the output device which is to print the character and creates a character record at the end of the current line and stores the current character information in the character record. This translating of the printable characters includes the handling of composite characters and possible vertical and horizontal positioning offsets. If the character mapping tables contain several levels of composites, for example, then that many character records (CR) are created and each character record after the first character record has the composite flag set.

Current attributes information from the column information block (CIB) are stored in each CR as well as the current relative vertical position (from super/subscripts), that can be adjusted if there is a vertical position offset from the character mapping table. The current horizontal position from the CIB is stored in the first composite's part character record (that is supposed to be the widest character) and the horizontal position in the CIB is updated by adding that character's width to it. All composite levels after this primary level are given horizontal positions that center them over the first (widest) character. This centering is performed by adding half the difference between the width of the current composite component and the width of the primary character to the horizontal position of the primary character. In order to simplify processing of the output codes, the CMT must be generated so that the widest output character of a composite character is stored in the composite level 1 table (table 603 in FIG. 6). The output character code of each composite component is also found in the CMT and stored in the CR. Other current CIB information, such as whether tabbing or dectabbing is occurring, right justification, stopping, centering, etc. is also stored in the character record or updated in the CIB by turning off a flag and setting a pointer to the current character record.

Block 315 does the actual chaining of the character record into the character record chain pointed to be the CIB. Character records are chained as a double-linked list structure as shown in FIG. 7. Each character record contains a printable character and specific information about that character as well as pointers to the next and previous character records. The character records are the canonical form of an output character and its associated information. The contents of the character record containing various pointers and flags is shown in Table 2.

FIG. 7 illustrates three character record chains associated with their respective columns in a page containing four columns. Chain 1 from CIB 701 contains character records 711 through 727, chain 2 from CIB 703 contains CRs 731 through 737, and chain 3 from CIB 707 contains CRs 771 through 783. CIB 705 has a null chain.

After processing the character, block 317 is entered to determine if line termination has occurred. If line termination has not occurred, block 317 exits to block 309 to retrieve the next character.

Block 317 checks whether the line building loop should be terminated. Line building is terminated on one of several conditions. A carriage return, page mark, imbedded format line, or other hard terminator causes exit from the loop and the immediate queuing of the line and the immediate resetting of the line pointers within the CIB. A line length exceeded condition also causes exit from the loop. The last character currently on the line is then called the "offending character" because it is a character that has gone beyond the right margin. When a line has been terminated, block 319 is entered.

In block 319, a search is made for a wrap point which is a point at which the characters at the end of the line can be wrapped to the beginning of the next line down. If it does not find a valid wrap character which is indicated by the wrap flag in the character records, the offending character becomes the wrap point. The wrap points in FIG. 7, as pointed to by the wrap pointer in the CIB, occur at character records 725, 737 and 781 in FIG. 7. After a wrap point has been determined, the character chain is broken at the wrap point by decoupling the link list at the wrap point. Space characters are then removed from the end of the completed line to prevent possible underscores from hanging off the end of the line and to facilitate right justification. The completed line is then queued in the line information block (LIB) which is shown in Table 4. The rest of the line from after the wrap point is then reset to the beginning of the next line in the CIB. The horizontal and vertical positions are reset within the CIB and the next time the column routine is entered for this column, the logical page is built at the end of the list.

When the line information block (LIB) is created, the justification side flag from the CIB is stored in it. Then, the justification side flag in the CIB is toggled (i.e., if it was TRUE, it becomes FALSE, and vice versa). The length of the line as given by the right margin, and the final width of the text in the line, are also stored in the LIB.

TABLE 4

Line Information Block (LIB)

Pointer to Next LIB
Pointer to Previous LIB
Pointer to Beginning to Character List
Pointer to End of Character List
Justification Side Flag
Test Length
Line Length
End of Page Flag
Wait on Paragraph Alignment Flag
Current Line Spacing Character Once a logical line within a colunn has been completed, block 321 is entered to perform justification of the text within the line if required by the format line or a justification character within the line. The process by which the text within a line is justified by the justify routine will be explained in greater detail with reference to FIG. 4 below.

After the line has been justified, block 323 is entered. Block 323 takes the list of character records associated with the logical line which has just terminated and inserts them on queued output information blocks (QOIB) from the CIB placing superscripts and subscripts on separate QOIBs from the regular text. Table 5 illustrates the contents of the QOIB. This results in each horizontal line that is located on a different vertical position to be on its own QOIB. This ordering by vertical position is done so that lines can be output to the printer in the correct order and to result in the text being printed in the correct vertical position on the page.

TABLE 5

Queued Output Information Block (QOIB)

Pointer to Next QOIB
Pointer to Beginning of Character List
Pointer to End of Character List
Relative Super/Sub Level
Absolute Vertical Position
Stop Character in This Line If multicolumn printing is occurring, block 323 also performs a blend operation which takes the QOIBs that are at the same vertical position from each CIB and links them together. This is so that different columns can be output to the printer at the correct vertical positions by taking logical lines in the same vertical position from each column and combining them into one physical line to be output to the printer. Thus, across a page all characters of the same vertical position will be output as one continuous line with multiple lines being output to handle the case of text being located at various vertical positions. An example sorted list of QOIBs is shown in FIG. 10, which shows a single column line created by taking the input buffer of text in FIG. 8 and translating it by use of the character mapping table of FIG. 6 to produce the character record chain of FIG. 9.

Block 325 determines whether a physical print line is ready to be output to the printer and, if not, returns to block 307 to build a line for the next column. If the print line is ready to be output to the printer, block 325 exits to block 327.

When the column routine is sure that a line is ready to be printed, it takes the line off the queued output information block queue and sends it to the appropriate output routine which is dependent upon the particular printer on which the document is to be printed. In block 327, the correct device driver is called as a function of the output device specified in the print control block. The device driver then takes the physical print line which has been passed to it and performs any additional processing required which may be necessary depending upon the particular output printer being used and then sends the manipulated print line to the printer.

In block 327, which is entered after each physical line is fully constructed and stored on the QOIB, the QOIB is passed off to an appropriate output routine where the linked list of character records is removed from the QOIB. The character record list is then traversed and an output buffer is constructed containing the characters from the character lists and printer specific formatting information such as escape sequences or printer controls which are used to perform attributes functions such as underscoring, bold printing, shadow printing or overstriking, horizontal positioning, etc.

The actual horizontal positioning accomplished by different printer specific output routines varies from printer to printer. For example, on a line printer spacing between gaps in a line is accomplished by inserting space characters in a buffer, whereas on a letter quality printer, spacing may be accomplished by inserting an escape sequence corresponding to an absolute horizontal tab within a line before the line is passed to the printer output driver.

It should be noted that all character blocks linked from a QOIB all have the same vertical position and that the QOIBs are processed from the highest vertical position to the lowest vertical position so that each line can be output to the printer starting with the highest vertical line and progressing to the lowest vertical line so that the paper can be advanced upward as the document is printed.

After the line is output, block 327 exits to block 305 to build the next line in each of the columns.

JUSTIFY ROUTINE

Figure 4:
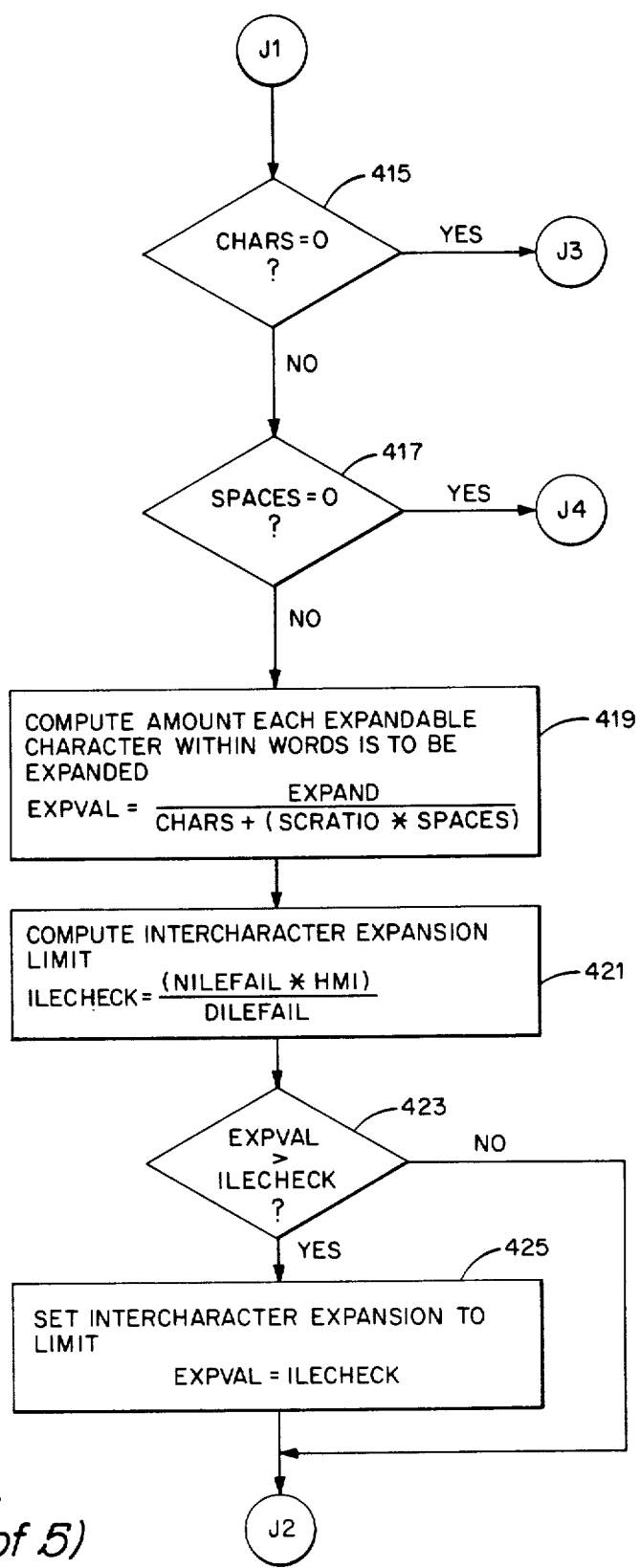
FIG. 4 is a flow diagram of the justification routine used by the column routine of FIG. 3.
Figure 4:
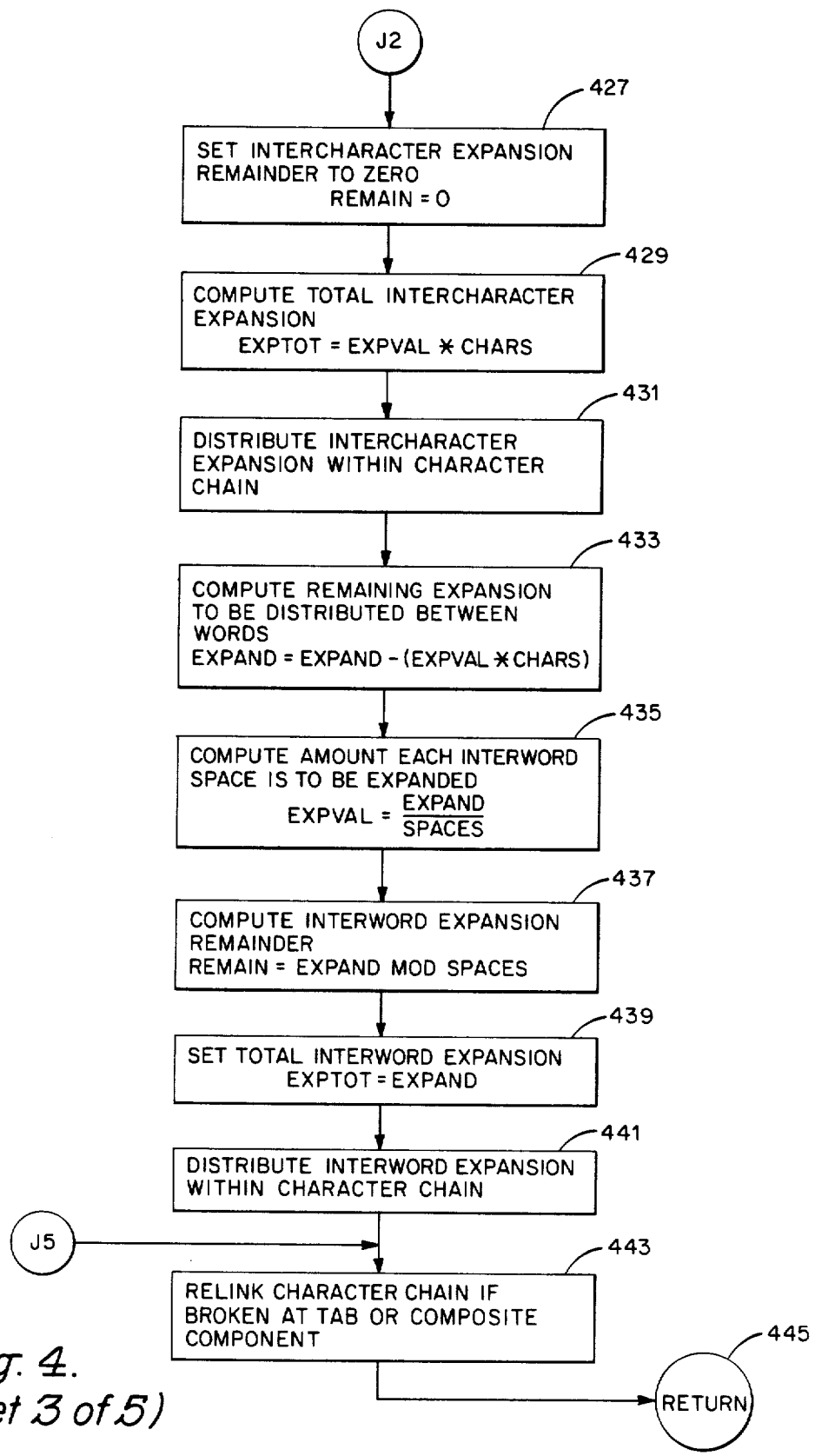

The justify routine is entered in block 401. FIG. 4 is a block diagram of the justify routine of the preferred embodiment. The justify routine is called at the end of the column build routine, if required, to perform right justification. It uses the information in the line information block (LIB) as well as the horizontal motion index (HMI) from the print control block. The LIB contains the pointers to beginning and end of the line, the target line length to justify the line, and the current length of the text in the line.

The justify routine is entered in block 401. In block 403, pointers are initialized to point to the beginning and end of the chain of character records associated with the line that is to be justified. Block 405 is then entered to compute the amount of expansion that is required which is the difference between the right margin and the text size.

Block 407 is then entered and the line is scanned backwards counting the number of expandable spaces, expandable characters, and composite character components. This backwards scan continues until the beginning of the line is encountered or until a character record with a non-justifiable character flag is encountered. For example, the non-justifiable character flag will be set in a character record if the character is the first character entered after a tab.

If during the backwards scan of the line performed in block 407, the scan stopped on a composite character, the forward scan is performed to move the pointer ahead to the last character record in the composite. This is done because the composite must be expanded together.

When the beginning of the chain is found by the backwards scan of block 407, the routine temporarily decouples the link list of character references there and uses the pointer to that character as it were the actual beginning of the line. This structure is called a semi-linked list and it is used for traversing part of a list as if it were a whole linked list.

Block 409 is then entered and the character count is then adjusted by the composite count to get the number of expandable characters within the line. The number of composite components of characters must be subtracted from the total number of expandable characters because the composites must be expanded as if they were one character because they will only require one character space when they are printed.

In block 411, a pointer is initialized to the end of the first expandable character so as to skip composite components. The breaking of the list at the first expandable character is performed in block 413 and a point is saved to the character record before the break. This breaking of the character record chain is caused by a character record which has its justify flag reset which indictes that this character occurs at a tab point so that characters occurring in the line earlier than the tab character cannot be moved during the right justification process.

Block 415 checks to determine if the number of expandable characters is equal to 0. If the number of expandable characters is not equal to 0, then block 417 is entered and a check is made to determine if the number of expandable spaces is equal to 0. If the number of expandable spaces is not equal to 0, then block 419 is entered.

In block 419, a computation is made to determine the portion of the expansion which is to be distributed between characters within words so that the space between words does not become too great when justifying a line. The justify routine attempts to place a certain portion of the expansion between characters within words and the rest of the expansion between the words. The amount to be distributed between characters within words and the amount to be distributed in the spaces between words is determined using a space-character ratio (SCRATIO). In the preferred embodiment, a 1 to 8 ratio is used which means that for each unit of expansion introduced between characters, eight units of expansion will be introduced for each space character between words. Therefore, in block 419, the total amount of expansion is divided by the number of characters plus the SCRATIO times the number of spaces occurring between words. It should be noted that because each space character is individually expanded, if the operator types 2 spaces between some words and one space between other words, the expansion between words separated by two spaces will be twice as great as the expansion between words separated by one space.

Block 421 is then entered to compute the intercharacter expansion limit. The intercharacter expansion limit (ILECHECK) is the maximum amount of expansion which will be allowed to be introduced between characters so that characters within words are not opened up an excessive amount. The intercharacter expansion limit is calculated by taking the horizontal motion index times a constant ratio of NILEFAIL divided by DILEFAIL. In the preferred embodiment, NILEFAIL is three and DILEFAIL is two such that the maximum amount of expansion which will be allowed between characters in the preferred embodiment is three halves of a standard character width.

Block 423 is then entered to check if the intercharacter expansion value exceeds the intercharacter expansion limit. If the expansion value does not exceed the limit, then block 423 exits to block 427 and the computed expansion value is used to expand between characters within a word.

If the intercharacter expansion value is greater than the intercharacter expansion limit, then block 425 is entered and the expansion value is set equal to the intercharacter expansion limit.

Block 427 is then entered to set the intercharacter expansion remainder to 0 so that any remaining expansion will occur between words.

Block 429 is then entered to compute the total expansion (EXPTOT) between characters which is the expansion value between each character multiplied by the number of expandable characters. Block 431 is then entered to distribute the intercharacter expansion within the character chain by distributing some of the expansion between characters within words. This distribution is done by the distribute routine of FIG. 5.

Block 433 is then entered to compute the remaining expansion to be distributed in the spaces between words. The remainder is computed by taking the total amount of expansion required and subtracting from it the amount of expansion that has alredy occurred between the characters.

Block 435 is then entered to compute the amount of expansion to be distributed in each interword space between pairs of words. This computation is done by taking the remaining amount to be expanded and dividing it by the number of space characters.

Block 437 is then entered to compute the remainder of the expansion which cannot be evenly distributed in the space characters between words. This is done by taking the remainder that occurs when when an integer divide operation is performed of the total amount of expansion divided by the number of space characters occurring between words. This is done by using a modulo function (MOD).

Blocks 439 is then entered to set the total expansion remaining to be distributed between words which is the expand value computed in block 433.

Block 441 is then entered to distribute the expansion in interword spaces within the character chain by use of the distribute routine of FIG. 5.

After all expansion has occurred between characters and between words, block 443 is then entered to re-link the character record chain broken at a tab or composite character so that that portion of the line which has been justified is re-linked to any portion of the line which cannot be justified and the completely justified line is then returned to the calling program in block 445.

As will be seen below in the discussion of the distribute routine, when space is being distributed between words within a line, any remainder obtained from the division of the total amount of expansion to be performed between words divided by the number of spaces there are between words is uniformly distributed between words until it is exhausted. In each line information block (LIB) there is a side flag which is toggled after each line is queued so that it alternates from line to line. This side flag determines whether the remainder, if any, is to be distributed beginning at the left or right hand end of the lines. By alternating this distribution, the possibility of rivers or wide gaps of space running down the page is reduced. This is much more important for printers with coarse granularity, such as line printers, then for letter quality printers on which each unit of the remainder may only correspond to 1/120 of an inch.

Returning now to block 415 where a check is made to determine whether the number of expandable characters in the line being justified is equal to 0. If the answer is yes, block 415 exits to block 447.

If block 447 is entered, it indicates that the line being justified does not contain any consecutive characters between which expansion can take place and that all expansion must take place in the space characters between words. In block 447, a check is made to determine if the number of expandable spaces is equal to 0 and, if so, block 447 exits to block 443 which does clean up before exiting the justification routine. If block 447 exits to block 443, it indicates that the line does not contain any expandable characters or expandable spaces between words and therefore no expansion of the line can take place and the line cannot be justified. If block 447 determines that there are expandable spaces within the line, then it exits to block 449.

Block 449 computes the portion of the expansion to be distributed in the space characters between words by taking the amount of expansion required and dividing it by the number of expandable space characters among which it is to be distributed.

Block 451 is then entered to compute the expansion remainder, which is the amount of expansion required that cannot be evenly distributed among all spaces. The remainder is calculated by taking the total amount of expansion required and doing integer division by the number of expandable spaces. This is down by using a modulo (MOD) function.

In block 453, the distribute routine is called to distribute the expansion into the interword spaces within the character chain. After the expansion is distributed, block 453 goes to block 443 where the justification of the line is completed.

Returning now to block 417 where a check is made to determine whether the number of expandable spaces was equal to 0 and, if so, block 417 exits to block 455. If this branch is taken, it indicates that there are expandable characters within the line being justified, but there are no expandable spaces between the words within the line being justified. Thus, all expansion of the line, if there is to be any at all, must occur between the characters within words and none of the expansion can take place in spaces between words.

In block 455, the amount to be expanded between each characters is calculated by taking the total amount of expansion required and dividing it by the number of expandable characters within the line.

In block 457, the amount of expansion that cannot be evenly distributed between characters is calculated by determining the remainder when the expansion total is divided by the number of characters. This is done by taking the total expansion modulo, the number of expandable characters using the MOD function.

Block 459 is then entered to compute the intercharacter expansion limit as was explained above with respect to block 421. This intercharacter expansion limit is calculated so as to not allow the expansion between characters within a word to become too excessive.

In block 461, a check is made to determine if the remainder can be distributed more or less unnoticeably between the characters within the line. This is done by comparing a constant REMFAIL with HMI which is the width of the standard character. The width of a standard character (HMI) is defined in terms of the number of granular units of the particular output device which will be used to print the line as discussed above.

For example, if a letter quality printer is being used in a 12-pitch mode and is capable of minimum movements of 1/120 of an inch, the standard character width is the width of a space and will have an HMI of 10 meaning that the printer device could make 10 of its minimum movements to traverse the distance of a standard character. In the preferred embodiment, the constant REMFAIL is defined as being equal to 6 such that if a printer with and HMI of 10 is being used, since 6 is not greater than 10, block 461 will take the no exit and go to block 465 without setting the remainder equal to 0. In this case, the remainder can be distributed between characters because it has been determined that an expansion between characters which is only 1/6 (thus the value of 6 for the constant of REMFAIL) of a character width more between some characters will not be noticed by a reader of the printed document.

In the case of a line printer which has an HMI of 1, meaning that the minimum distance that the printhead can move is one full standard character width, the check in block 461 will take the yes exit because 6 is greater than 1 and block 463 will be entered. In this case, the remainder cannot be distributed between the characters because it is felt than an expansion of one full character width more between some characters (until the remainder is exhausted) will be noticeable compared to the expansion between the characters in which one unit more of the remainder is not being added. In block 463, the remainder is set equal to 0 so that it will not be distributed between characters.

Thus, the comparison made in block 461 and the setting of the remainder in block 463 assures that if all expansion must take place between characters and none of it between words, the remainder will only be allowed to be distributed between characters if, at most, 1/6 of a character width more expansion will occur between characters in which a portion of the remainder is distributed than will occur between the other characters after distribution of all of the remainder has been exhausted.

Block 465 is then entered to determine whether the amount of expansion that is to take place between characters is greater than or equal to the the intercharacter expansion limit calculated in block 459. If block 465 determines that the intercharacter expansion does not exceed the limit, then it exits to block 469. If the intercharacter expansion value exceeds the limit, block 465 exits to block 467.

In block 467, the expansion value between characters is set to the intercharacter expansion limit and the remainder is set equal to 0 so that no distribution of the remainder will take place between characters because those expansions which contain one additional unit of the remainder would exceed the intercharacter expansion limit.

In block 469, a computation is made of the total expansion which will occur, which is the expansion between each character times the number of expandable characters plus the remainder.

Block 471 is then entered and a call is made to the distribute routine to distribute the expansion between the characters within the words. After the expansion has been distributed between the characters, the justification of the line is completed and block 471 goes to block 443 prior to returning to caller of the justification routine.

DISTRIBUTE SPACE ROUTINE

The expansion distribute routine is illustrated in FIG. 5. The distribute routine is called by the justify routine to distribute the expansion between characters within words or in the spaces between words when a line is being expanded to justify the right margin.

The distribute routine is entered in block 501. In block 503 a check is performed to determine whether expansion distribution is to be done left-to-right (from the beginning of the character record chain) or right-to-left (from the end of the character record chain). This check is performed by examining the side flag in the line information block (LIB) to determine whether any remainder is to be distributed at the beginning or the end of the line. The toggling of the side flag as each line is generated helps reduce the possibility of rivers of white space forming at either the beginning or the end of a line by alternating where the expansion remainder, which cannot be uniformly distributed, is distributed.

If distribution is to be done from left to right, block 505 is entered and the pointer to the first character to be expanded is set to point to the beginning of the chain of character records. If expansion is to be performed right to left, then the pointer is set to the last character at the end of the character record chain in block 507.

In block 509, a check is made to determine whether the pointer to the current character record in the character record chain is equal to NIL. If NIL, it indicates that the end of the chain has been reached and the expansion distribution is done and block 509 exits to block 511 which returns to the caller of the distribute routine. If the character pointer is not NIL, then block 513 is entered.

In block 513, a check is performed to see whether the current character is expandable. The current character is not expandable if the next character is a composite part of the current character, the current character is a space and interword expansion is not being done, or the current character and the next character are both not spaces and interletter expansion is not being done. If the current character is not expandable, block 515 is entered and the next character is moved to the right by augmenting its horizontal position within its character record by the current value of the total expansion (EXPTOT).

If the current character is expandable, block 513 exits to block 517 which checks whether distributing is being done from left-to-right or right-to-left. If distributing the expansion from left-to-right, block 519 is entered and the cumulative expansion value is incremented by the expansion value. If distributing from right-to-left, block 517 exits to block 533.

Block 519 exits to block 521 which performs a check to determine if the remainder is equal to 0. If the remainder is equal to 0, then all expansion which could not be uniformly distributed, has been distributed and there is nothing more that needs to be done with the remainder. If there was a remainder and it has not all been distributed (i.e., exhausted by distributing 1 granular unit each time a character is expanded), then block 523 is entered and the cumulative expansion value is incremented by one and the remainder is decremented by one. Block 523 then exits to block 525.

Block 525 adjusts the horizontal position of the next character to the right by the cumulative expansion value (EXPTOT). This is done by taking the horizontal position of the next character to the right as found in the character record associated with it and adding the cumulative expansion value (EXPTOT) to it.

Block 527 is then entered and a check is performed to determine if the distribution of the expansion is being done from left-to-right or right-to-left. If from left-to-right, block 529 is entered and the current character pointer is moved to point to the next character to the right. If expanding right-to-left, block 531 is entered and the current character pointer is moved to the previous character to the left. After adjusting the current character pointer in either block 529 or block 531, the routine returns to block 509 which then checks if the end of the character record chain has been reached.

Returning now to block 533 which is entered if expansion is taking place from right-to-left, after it is determined that the current character is an expandable character. In block 533, the horizontal position of the next character to the right it adjusted by the cumulative expansion value (EXPTOT).

Block 535 is then entered and the cumulative expansion value is decremented by the expansion value. This is done because, when expanding form right-to-left, the character at the right end of the line is moved by the total amount to be expanded and each subsequent character is moved by ever decreasing amounts, with the amount of decrease being equal to the individual expansion value (EXPVAL).

In block 537, a check is made to determine whether the remainder is equal to 0 and, if so, exits to block 527. If the remainder is not 0, then the cumulative expansion value is decremented by one and the remainder is also decremented by one. Thus, it can be appreciated that when distributing from right-to-left, the remainder is distributed one unit at a time at each place than an expansion is made until the remainder is exhausted. Block 539 then goes to block 527.

Source code program listings of the justify routine and the distribute routine are attached to this application in the Appendix. These programs are written in the PASCAL programming language available on the Honeywell Information Systems Inc. DPS 6 line of computers. This language is described in detail in the Honeywell Information Systems Inc. manual entitled, *DPS 6 and Level 6 GCOS 6 Pascal User's Guide*, Order Number CZ40, which is incorporated herein by reference.

From the above discussion of the justify routine and the distribute routine, it can be appreciated that justification of a line occurs by first attempting to distribute a portion of the expansion between characters within words up to a certain limit so that the characters are not excessively spaced apart and that the rest of the required expansion is distributed in spaces between words. It can be further appreciated that because the amount of expansion between characters and between words cannot always be uniform that the distribution of the non-uniform, or remainder, portion of the expansion is alternated between the left and right ends of the lines so as to reduce as much as possible the occurrence of rivers, or excessive white space, which might otherwise occur along the end of the line if the remainder is always distributed along one side. It can be further appreciated that by using the horizontal motion index (HMI) and printer granularity units, a standard justification process can be used for all output devices.

EXAMPLE OF JUSTIFICATION WITH A COMPOSITE CHARACTER

Figure 8:
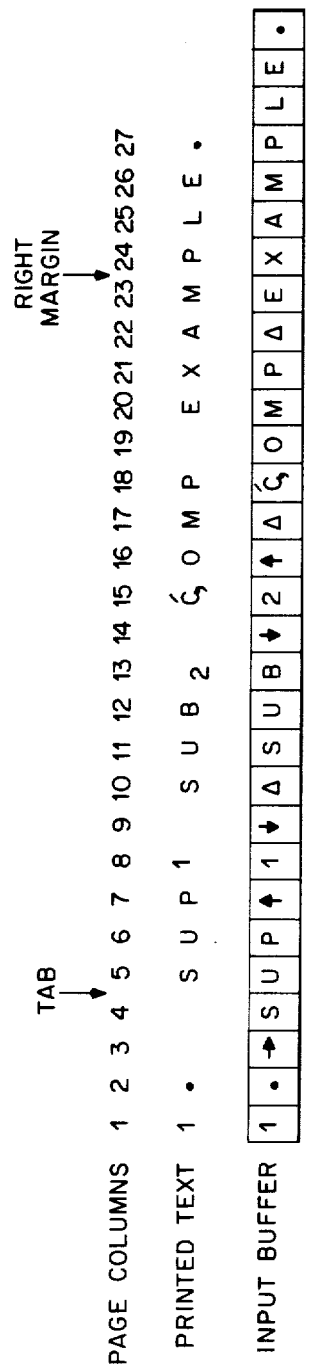
FIG. 8 is an example of text to be printed and its corresponding document text buffer.

FIG. 8 shows an example of a line of printed text and its corresponding input buffer which would be presented to the print routine to be printed on an output device. The first row in FIG. 8 shows the various columns across a page with an indication that a tab has been set between columns 4 and 5 and right margin has been set between columns 23 and 24. The printed text row in FIG. 8 shows that it is desired to have the line of text contain a superscript "1" on the word "SUP", and a subscript "2" on the word "SUB". It will also be noticed that the character in column 15 is to be a composite character consisting of an accent over an uppercase letter "C" with a comma under the letter (used, for example, to simulate the French accent cedila). The input buffer row in FIG. 8 shows the corresponding characters which would be presented to the print routine to be printed on the output device.

In the input buffer of FIG. 8, the right arrow is used to indicate a tab key was depressed, the up arrow is used to indicate that the superscript key was depressed, the down arrow is used to indicate that a subscript key was depressed, and the delta is used to indicate that a space character was depressed. It will be noted that the composite character "C", with an accent over and a comma under, is indicated by a single character in the input buffer. This assumes that the keyboard on which the document was entered had a key that corresponded to this composite character. In actuality, the composite character may be indicated by a multiple character sequence in the input buffer indicating that the character code for this character is a special character code.

Figure 9:
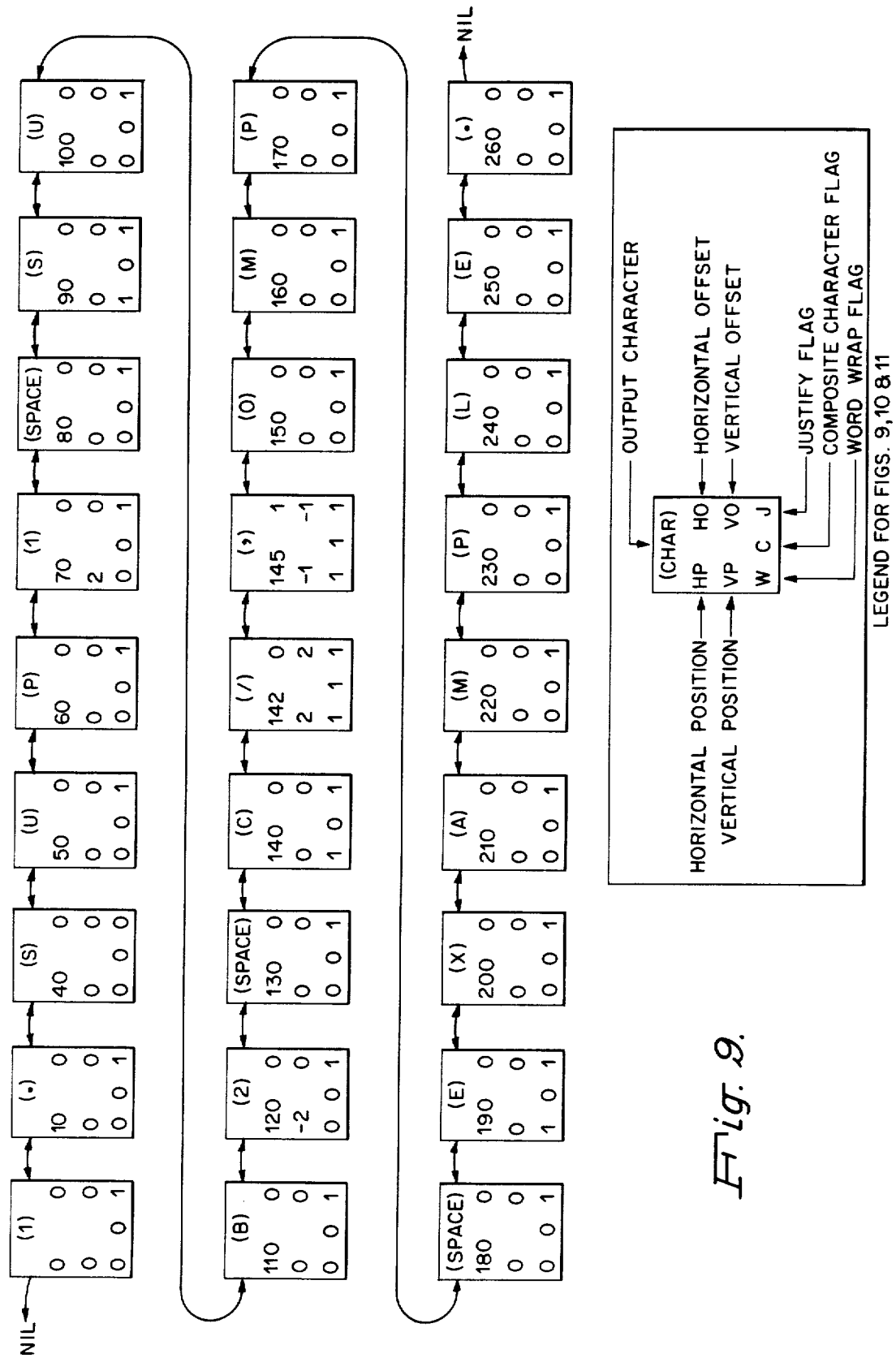
FIG. 9 is the character record chain corresponding to the example in FIG. 8 before justification.
Figure 10:
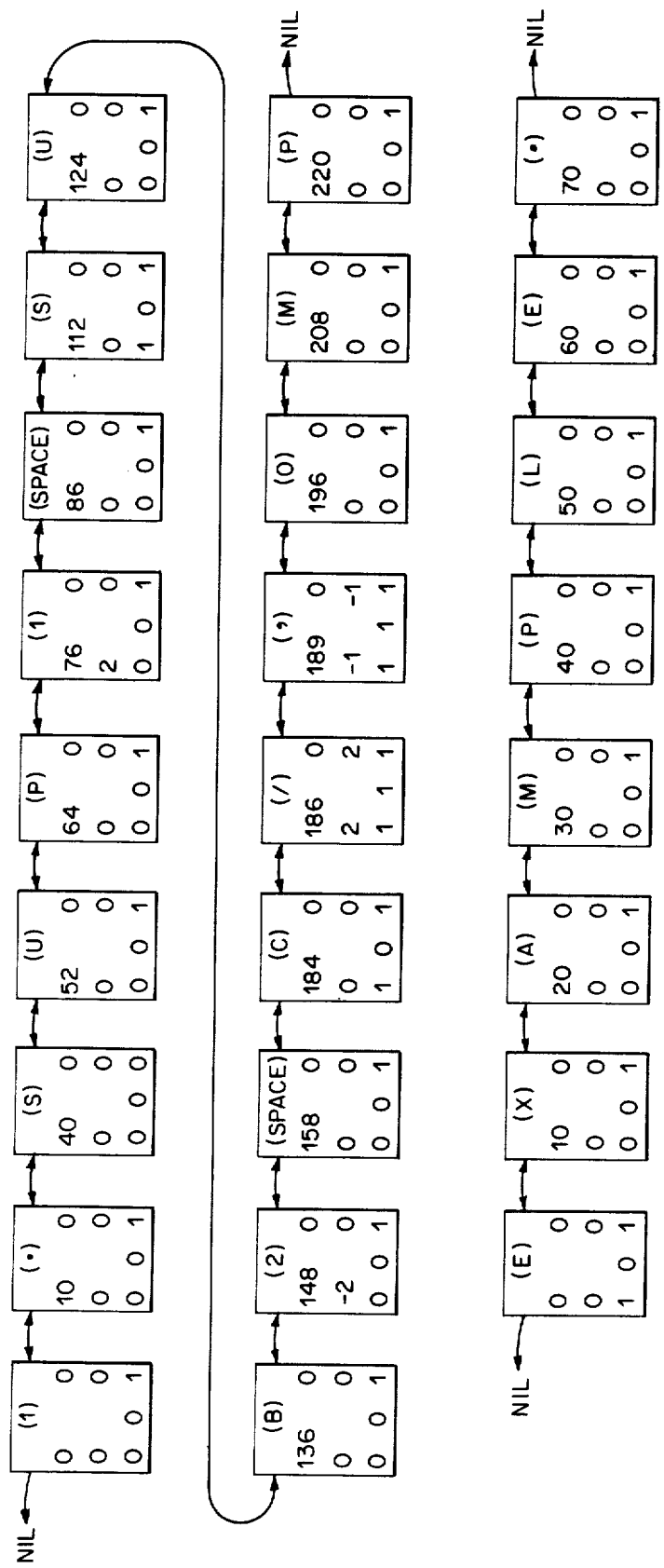
FIG. 10 is the character record chain of the example in FIG. 9 after justification.

FIG. 9 illustrates the character record chain which corresponds to the input buffer of FIG. 8 after the input buffer has been translated by the print program through use of the character mapping table shown in FIG. 6. In FIG. 9, the pointers between character records are indicated by the arches having arrowheads which point to the next character record and to the previous character record in the chain. In FIG. 9, the symbol within the parentheses in the top of the blocks corresponding to the character records indicates the output character graphic which will appear on the page when the document is printed. In character records, this character graphic is represented by a multibit code which, when output to the output device, will cause that character graphic to be produced. The second row within the character record blocks of FIG. 9 holds the horizontal position and horizontal offset, both of which are in horizontal granular units of the output device which will be used to print the document. In this example, it is assumed that all characters, with the exception of the accent and comma characters, have a standard width of ten granular units such that the character in the first column starts at position 0 and the character in the second column starts at horizontal position 10, etc. In this example, the accent character has a width of six granular units and the comma character has a width of four granular units. The horizontal position of the accent and comma characters reflect the centering of these characters over the "C" based on their widths as described above. The comma has, in addition, been moved one granular unit to the right of its centered position because a horizontal offset of one was specified in the character mapping table (see FIG. 6 table 619).

The third row in the character record blocks of FIG. 9 contains the vertical position and vertical offset of the character in vertical granular units of the output device which is to be used to print the document. For this example, it is assumed that the output device can make 48 vertical movements per inch and the document is to be printed at 8 lines per inch. This means that the output device is capable of making 6 vertical movements per line and that superscripting and subscripting will be done by shifting up $\frac{1}{3}$ or down $\frac{1}{3}$ for each level of superscript or subscript, respectively, and therefore a subscripting of level 1 will result in a vertical movement of $-2$ and two levels of superscripting will result in a vertical movement of $+4$.

The bottom line of the character record blocks illustrated in FIG. 9 contains the word wrap, composite character, and justify flags. If the word wrap flag is equal to 1, it means that this character is the beginning of a wrap point. The wrap flag is a 1 in the character records having horizontal positions 90, 140, 142, 145 and 190. These characters correspond to the beginning of words in the line of text. The character records with horizontal positions of 140, 142 and 145 each have the wrap flag set because they each are the beginning character of a word in that together they make a composite character.

The composite flag, which is the middle flag in the bottom line, is a 1 if the character record is the second through N character within a composite character. The composite flag is a 1 in the character records which correspond to the character records having horizontal positions 142 and 145.

The justify flag, which is the right flag in the bottom line, is a 1 if the character can be moved during the justification process. This flag is a 1 in all character records in FIG. 9, with the exception of the character record which corresponds to the character having a horizontal position of 40, which is the "S" in the word "SUP" which cannot be moved because it was the first character occurring in the line after the tab key was depressed.

FIG. 10 illustrates the result of justifying the character record chain of the example shown in FIG. 9. As illustrated in FIG. 8, the righthand margin was set between columns 23 and 24 so that the righthand margin is set at horizontal position 230. When the character record chain is scanned backwards from the end of the chain to find a wrap point, the first wrap point that is found is for the character record of the letter "E" in the word "EXAMPLE", which has a horizontal position of 190. Therefore, the character record chain is broken at this point and the character records associated with the character records in the chain beyond this point become the next line of text and their horizontal positions are adjusted accordingly such that in FIG. 10 the character records associated with the word "EXAMPLE" begin in horizontal position 0 and continue through horizontal position 70. The space character after the word "COMP" is also deleted and therefore the character record chain which is to be justified contains the character "1", which begins at horizontal position 0, through the character "P", which begins in horizontal position 170.

To determine the amount a line has to be expanded during the justification process, the length of thi line which is 180 horizontal granular units wide, is subtracted from the righthand margin position, which is horizontal position 230 to produce the amount of expansion required, being 50 horizontal granular units. When the line is scanned backwards, it is found that the "S" in horizontal position 40 is non-justifiable so that any characters occurring in the chain before this character record cannot be repositioned during the justification process. When the number of expandable characters in the segment of the line which can be justified as counted, it is determined that the number of expandable characters (CHARS) is equal to 11 and the number of composite components (COMPS) is equal to 2. Therefore, the number of expandable characters adjusted for composite components is 11 minus 2 which gives a result of 9. The number of expandable spaces on that portion of the line which can be expanded is 2. These space characters are those which appear in FIG. 9 in horizontal positions 80 and 130.

When the justification routine determines the amount that each expandable character is to be expanded, the amount of expansion (50) is divided by the number of expandable characters (9), plus the space character ratio (8 to 1) times the number of expandable spaces (2), which results in 50 being divided by 9, plus 8 times 2, which is equal to 50 over 25 which yields an intercharacter expansion value (EXPVAL) of 2. The justify routine would then call the distribute routine to expand each expandable character by 2 horizontal granular units.

The justify routine then determines the amount of expansion that remains to be done in the spaces between words. This is calculated by taking the total amount of expansion required, which is 50, and subtracting from it the amount of intercharacter expansion which was done, which is 2 times 9, such that 50−18 is equal to a total of 32 granular units of expansion which is required to be distributed among the spaces which occur in the character record chain. The expansion value for each interword space is calculated by taking the amount of expansion (32) and dividing it by the number of spaces (2) to produce an interword expansion value of 16 horizontal granular units. The distribute routine is then called with an expansion value of 16 which is used expand each space character and reposition any adjacent characters.

The above example of justification does not have any remainders occurring when either the intercharacter or interword expansion values were calculated. If a remainder had occurred when the intercharacter expansion value had been calculated, it would have been set equal to 0 and not distributed between the characters because there are spaces in the line in which it can be distributed.

If a remainder had occurred when the interword space expansion was calculated, it would have been distributed one granular unit at a time in addition to the 16 units that each space is expanded until it had been exhausted. This remainder would have been distributed starting from either the left or right end of the line depending upon where the value of the side flag in the line information block associated with the line being justified.

At the end of the justification routine, the character record chain associated with the character record chain of FIG. 9 would be as shown in FIG. 10 with the horizontal positions updated as indicated with the character record having a horizontal position of 220, which is the "P" at the right end of the line, pointing forward to NIL and the character record having the "E" character of the word "EXAMPLE" having a horizontal position of 0 pointing backwards to NIL because this character record is the beginning of the next print line.

Figure 11:
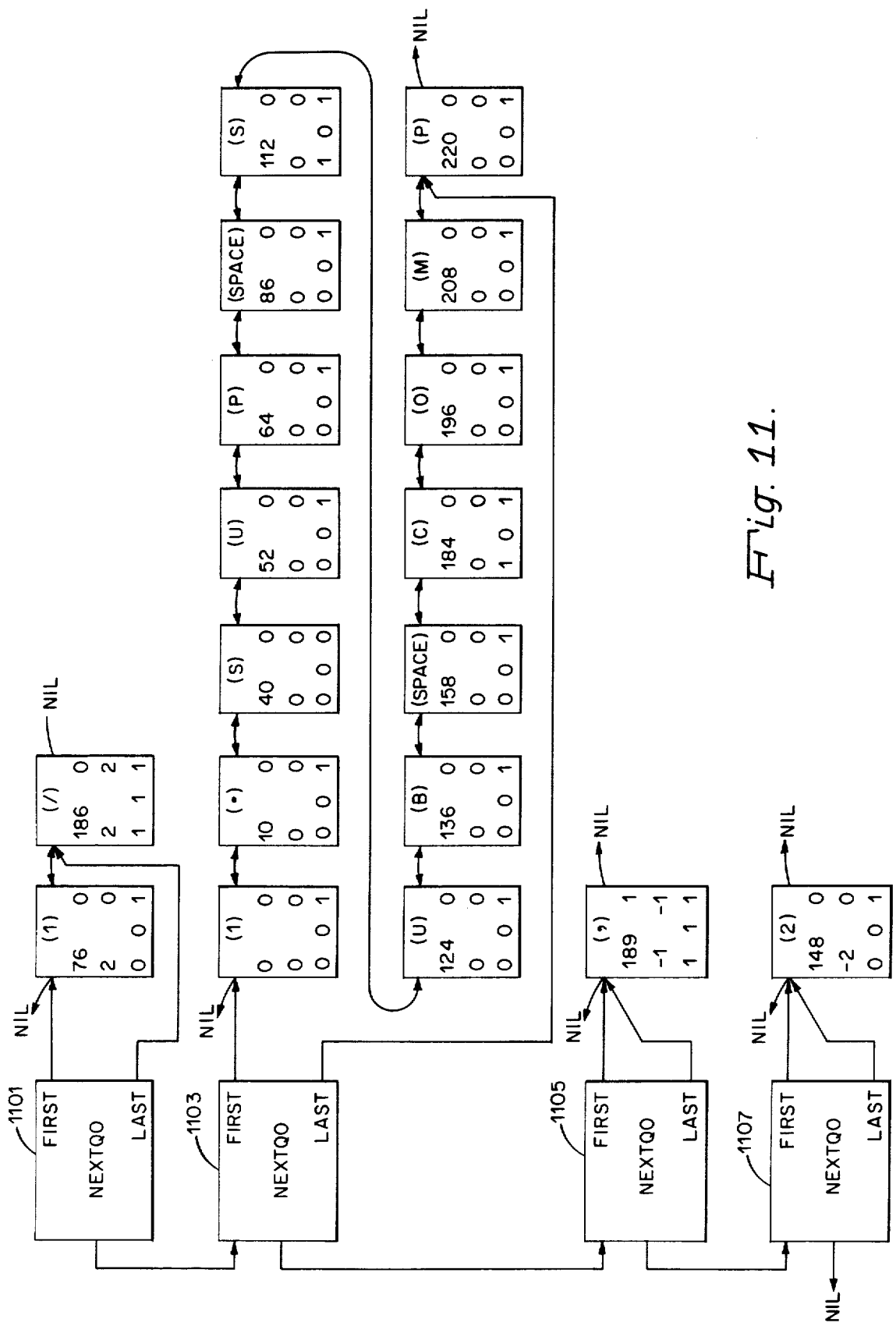
FIG. 11 is the linked queued output information blocks corresponding to the character chain of the example in FIG. 10.

FIG. 11 illustrates the result of the sorting of the character records within an output line by their vertical position before the output lines are passed to the physical output device driver which will actually print the lines. As indicated previously, output lines are sorted such that those that must be positioned higher on the page are output first and then the next lower line is output so that the paper can be advanced up within the output device. In FIG. 10, there are four queued output information blocks (QOIB) which are blocks 1101, 1103, 1105 and 1107.

The four QOIBs in FIG. 11 are linked by a next (NEXTQO) pointer, which points to the next QOIB except for the last one which points to NIL. QOIB 1101 has a character record chain of two character records in it which are to be printed at vertical position 2. These character records correspond to the character "1" which is to be printed as a superscript and to the accent which is to be printed above the composite "C" character. QOIB 1103 contains 14 character records which corresponds to the main line of the printed text. QOIB 1105 contains a single character record, which is the comma, which is to be printed at a relative vertical position of −1 under the composite "C" character and QOIB 1107 also contains one character record which corresponds to the character "2" which is to appear as a subscript. It has a relative vertical position of −2.

When these character chains are actually output to the output device by vertical position, each character record chain will result in one line of text being printed on the output device such that the line of text shown in the example illustrated in FIG. 8 will result in 4 separate lines of text being output to the printer.

From the above discussion, it can be appreciated that the justification method and the method of handling composite characters of the present invention allows a wide range of flexibility for justifying text within lines and for composing composite characters such that composite characters may be composed by multistriking individual characters with each individual character being capable of having either a vertical or horizontal offset.

Although the preferred embodiment has been described in terms of right justification on a line, this method is equally applicable to performing left justification.

Although the preferred embodiment has been described in terms of alternating the use of the remainder between consecutive lines with the use of the remainder starting at either the right or the left end of the line, it is envisioned that an extension would be to exhaust the remainder by working from the center on every third line.

Although the preferred embodiment has been described in terms of using a printer as the output device, the invention is equally applicable to other types of output devices.

Although the justification method has been described in terms of doing intercharacter expansion in addition to interword expansion, intercharacter expansion could be eliminated with all expansion then taking place in the spaces between words. Similarly, the method could be changed to do only intercharacter expansion and no interword expansion. These changes could be done by setting the character to space expansion ratio (SCRATIO) to either a large number or to zero, respectively. A better method would be to modify the justify routine logic to eliminate the unused logic, as would be obvious to one skilled in the art.

While the invention has been shown and described with reference to the preferred embodiment thereof, it will be understood by those skilled in the art that the above and other changes in form and detail may be made therein without departing from the spirit and scope of the invention.

```
[     TITLE     .TFY,'30MAY850' Right Justifica    Routine          }

[     TITLE     ZJSTFY,'30MAY850' Right Justification Routine       }
PROGRAM ZJSTFY;
($NOMAIN)
[ ****************************************************************** }
[ GCOS 6 PASCAL print program eight justification routine.           }
[                                                                    }
[                      ,                                             }
[                                                                    }
[ ****************************************************************** }
CONST                             [ GLOBAL CONSTANTS:                }
                                  [                                  }
     space    = 32;               [ Space character         <hex 20> }
     maxifont = 63;               [ Maximum number of fonts          }
                                  [                                  }
TYPE                              [ GLOBAL TYPES:                    }
                                  [                                  }
     byte     = 0..255;           [ One byte integer subrange        }
     fcode_t  = 0..maxifont;      [ Font code type                   }
                                  [                                  }
     char_sets = (                [ Valid character sets:            }
                regchar,          [   Regular characters             }
                shftout,          [   Shift out characters           }
                graphic,          [   NOT VALID <RFU>                }
                rfuchar );        [   NOT VALID <RFU>                }
                                  [                                  }
     char_ptr = ^char_rec;        [ Pointer to char_rec              }
                                  [                                  }
     char_rec = PACKED RECORD     [ Character information record:    }
           next : char_ptr;       [   Pointer to next char_rec       }
           prev : char_ptr;       [   Pointer to previous char_rec   }
           vpos : integer;        [   Char's vertical position       }
           hpos : integer;        [   Char's horizontal position     }
           voff : -128..127;      [   Vertical adjustment offset     }
           hoff : -128..127;      [   Horizontal adjustment offset   }
           ch   : byte;           [   The character                  }
           font : fcode_t;        [   Font I.D.                      }
           cset : char_sets;      [   Character set                  }
```

```
                wrap  : boolean;       {   TRUE if character may be wrapped  }
                                       {     to next line                   }
                stop  : boolean;       {   TRUE if STOP before this character}
                jsfy  : boolean;       {   TRUE if right justifying          }
                reqd  : boolean;       {   TRUE if non-expandible <req. sp>  }
                comp  : boolean;       {   TRUE if compound character        }
                uscr  : boolean;       {   TRUE if underscored character     }
                cusc  : boolean;       {   TRUE if cont. uscore to next char }
                bold  : boolean;       {   TRUE if bold print character      }
                shad  : boolean;       {   TRUE if shadow print character    }
                over  : boolean;       {   TRUE if overstruck character      }
            END;                       {                                    }
                                       {                                    }
                                       {                                    }
%PAGE;
TYPE                                   {  GLOBAL TYPES:                     }
                                       {                                    }
    qlin_ptr  =  ^qline_t;             {  Pointer to pending lines          }
    qline_t   =  RECORD                {  Pending logical lines rec:        }
                   next  : qlin_ptr;   {    Next pending line               }
                   prev  : qlin_ptr;   {    Previous pending line           }
                   lbeg  : char_ptr;   {    Beginning of pending line       }
                   lend  : char_ptr;   {    End of pending line             }
                   side  : boolean;    {    Justification side              }
                   txsz  : integer;    {    Text length                     }
                   lnsz  : integer;    {    Line length                     }
                   endp  : boolean;    {    TRUE if end of page             }
                   wait  : boolean;    {    TRUE if wait on paragraph       }
                   spcc  : char;       {    Current line spacing char       }
                 END;                  {                                    }
                                       {                                    }
PROCEDURE ZJSTFY(                      {  Rt. justification routine:        }
              hmi     : integer;       {    Horizontal Motion Index         }
              VAR lib : qlin_ptr );    {    Line Information Block          }
EXTERNAL;                              {                                    }
                                       {                                    }
                                       {                                    }
PROCEDURE zjstfy;                      {  Right justification routine       }
                                       {                                    }
                                       {                                    }
CONST                                  {  ZJSTFY constants:                 }
                                       {                                    }
   sc_ratio  = 8;                      {  Ratio of interword expan-         }
                                       {    sion to interletter ex-        }
                                       {    pansion                         }
   n_ilefail = 3;                      {  Numerator and denominator         }
   d_ilefail = 2;                      {    of expansion fail limit         }
                                       {    for interletter expansion       }
   remfail   = 6;                      {  Minimum printer granularity       }
                                       {    which allows distribution       }
                                       {    of remainder on interlet-       }
                                       {    ter-only expansion              }
                                       {                                    }
VAR                                    {  ZJSTFY variables:                 }
                                       {                                    }
   chars   : integer;                  {  Number of expandible chars        }
   comps   : integer;                  {  Number of extra chars on          }
                                       {    any composite chars             }
   expand  : integer;                  {  Amount to expand line             }
   expval  : integer;                  {  Amt to expd a char or space       }
   exptot  : integer;                  {  Total amt to move curr char       }
   ilecheck: integer;                  {  Max interletter expansion         }
```

```
       jbeg       : char_ptr;                      { Beginning of justified part  }
       jbgprv     : char_ptr;                      { Ptr to char before jbeg      }
       jend       : char_ptr;                      { End of justified part        }
       jdone      : boolean;                       { TRUE if done or quitting     }
       remain     : integer;                       { Remainder from division      }
       skipcomp   : boolean;                       { TRUE if jbeg is on a         }
                                                   {    composite character       }
       spaces     : integer;                       { Number of expandible spaces  }
       spfound    : boolean;                       { TRUE if space encountered    }
       splast     : boolean;                       { TRUE if last char is space   }
  PROCEDURE DISTRIBUTE(                            {                              }
                    intword  : boolean       );    { TRUE if expanding interword  }
                                  .                {  FALSE if exp. interletter   }
                                                   {                              }
  VAR                                              { DISTRIBUTE variables:        }
                                  ,                {                              }
       chnx     : char_ptr;         ,              { Ptr to next char record      }
       chp      : char_ptr;                        { Ptr to curr char record      }
       spchar   : boolean;                         { TRUE if curr char is space   }
       spnext   : boolean;                         { TRUE if next char is space   }
       vexp     : boolean;                         { TRUE if curr char is valid   }
                                                   {    for expansion             }
                                                   {                              }
  BEGIN                                            { DISTRIBUTE                   }
                                                   {                              }
     IF lib^.side THEN                             { If expanding from left to    }
       BEGIN                                       {   right, set traverser at    }
         chp := jbeg;                              {   beginning, set curr exp    }
         exptot := 0;                              {   total to 0 and accumulate  }
       END                                         {                              }
     ELSE                                          { If expanding from right to   }
       chp := jend;                                {   left, set traverser at     }
                                                   {   end, leave curr exp total  }
                                                   {   alone and unaccumulate     }
     WHILE chp <> NIL DO                           { Traverse to end (or begin-   }
       BEGIN                                       {   ning) of list              }
         chnx := chp^.next;                        { Get ptr to next one          }
         IF chnx <> NIL THEN                       { Check for NIL ptr            }
           BEGIN                                   {                              }
             spchar := FALSE;                      { Initialize booleans          }
             spnext := FALSE;                      {                              }
             IF (chp^.ch = space)                  { Indicate space found if      }
                 AND NOT chp^.reqd THEN            {   curr char is a non-        }
               spchar := TRUE;                     {   required space             }
             IF (chnx^.ch = space)                 { Indicate space found if      }
                 AND NOT chnx^.reqd THEN           {   next char is a non-        }
               spnext := TRUE;                     {   required space             }
             vexp := NOT chnx^.comp AND            { Char is valid for expansion  }
                 ((spchar AND intword) OR NOT      {   if:  the next char is not  }
                 (spchar OR spnext OR intword));   {   a composite part of the    }
                                                   {   curr char, the curr char   }
  { is a space and we're doing interword expansion, or the curr char and next     }
  { char are both not spaces and we're doing interletter expansion                }
             IF vexp THEN                          { If curr char is valid for    }
               BEGIN                               {   expansion                  }
                 IF lib^.side THEN                 { If expanding from the left   }
                   BEGIN                           {                              }
                     exptot := exptot + expval;    { Adjust expansion width       }
                     IF remain > 0 THEN            { Check if adding remainder    }
                       BEGIN                       {                              }
                         exptot := exptot + 1;     { Add to expansion width       }
                         remain := remain - 1;     { Decrement remainder          }
                       END;                        {                              }
```

```
                    chnx^.hpos :=                    { Expand curr char by moving   }
                        chnx^.hpos + exptot;         {   next char to the right     }
                END                                  {                              }
            ELSE                                     { If expanding from the left   }
                BEGIN                                {                              }
                    chnx^.hpos :=                    { Expand curr char by moving   }
                        chnx^.hpos + exptot;         {   next char to the right     }
                    exptot := exptot - expval;       { Adjust expansion width       }
                    IF remain > 0 THEN               { Check if subtracting         }
                        BEGIN                        {   remainder                  }
                            exptot := exptot - 1;    { Subtract from expansion wid  }
                            remain := remain - 1;    { Decrement remainder          }
                        END;                         {                              }
                END;                                 {                              }
        END                                          {                              }
        ELSE                                         { If not expanding char, just  }
            chnx^.hpos :=                            {   move next char without     }
                chnx^.hpos + exptot;                 {   adjusting expansion width  }
        END;                                         {                              }
    IF lib^.side THEN                                { If expanding from left,      }
        chp := chp^.next                             {   point to next char rec     }
    ELSE                                             { If expanding from right,     }
        chp := chp^.prev;                            {   point to prev char rec     }
    END;                                             {                              }
                                                     {                              }
END;                                                 { DISTRIBUTE                   }
BEGIN                                                { ZJSTFY                       }
                                                     {                              }
                                                     {                              }
jend := lib^.lend;                                   { Get ptr to end of line       }
jbgprv := NIL;                                       { Initialize pointer           }
                                                     {                              }
expand := lib^.lnsz - lib^.txsz;                     { Compute amt to expand        }
IF expand <> 0 THEN                                  { If not already justified     }
    BEGIN                                            {                              }
        jbeg := jend;                                { Set begin ptr to end of      }
                                                     {   line and scan backwards    }
        chars := 0;                                  { Initialize # of chars and    }
        comps := 0;                                  {   composites                 }
        splast := FALSE;                             { Initialize boolean           }
        IF (jbeg^.ch = space)                        { If last char is an expand-   }
                AND NOT jbeg^.reqd THEN              {   able space                 }
            BEGIN                                    {                              }
                IF jbeg^.prev <> NIL THEN            { Check if alone on line       }
                    splast := TRUE;                  { Indicate last char is space  }
                spfound := TRUE;                     { Indicate char was a space    }
                spaces := 1;                         { Set space count              }
            END                                      {                              }
        ELSE                                         { If last char is not an       }
            BEGIN                                    {   expandable space           }
                spfound := FALSE;                    { Indicate char was not a sp   }
                spaces := 0;                         { Set space count              }
            END;                                     {                              }
        IF jbeg^.comp THEN                           { If last char was part of a   }
            comps := 1;                              {   composite, set count to 1  }
        WHILE (jbeg^.prev <> NIL) AND                { Now scan backwards, and      }
                jbeg^.prev^.jsfy DO                  {   count spaces, chars, and   }
            BEGIN                                    {   comps until beginning or   }
                jbeg := jbeg^.prev;                  {   1st jstifyable char found  }
                IF jbeg^.comp THEN                   { Count composites             }
                    comps := comps + 1;              {                              }
                IF (jbeg^.ch = space)                { If expandable space          }
                        AND NOT jbeg^.reqd THEN      {                              }
                    BEGIN                            {                              }
```

```
          spaces := spaces + 1;          { Increment space count          }
          spfound := TRUE;               { Indicate space found           }
        END                              {                                }
      ELSE                               { If not expandable space        }
        BEGIN                            {                                }
          IF NOT spfound THEN            { Increment chars count if       }
            chars := chars + 1;          {   char did not precede a sp    }
          spfound := FALSE;              { Indicate char was not a sp     }
        END;                             {                                }
    END;                                 {                                }
chars := chars - comps;                  { Adjust chars count for         }
                                         {   composites                   }
skipcomp := TRUE;                        { Set boolean for REPEAT loop    }
IF jbeg^.next <> NIL THEN                { Check for NIL                  }
  REPEAT                                 { If jbeg points to a part of    }
    IF jbeg^.next^.comp THEN             {   a composite character,       }
      jbeg := jbeg^.next                 {   bump it ahead until it       }
    ELSE                                 {   points to the last           }
      BEGIN                              {   component of the             }
        jbgprv := jbeg^.prev;            {   composite character          }
        jbeg^.prev := NIL;               { Break line into semi-linked    }
        skipcomp := FALSE;               {   list, so we can traverse     }
      END;                               {   back and forth between       }
  UNTIL NOT skipcomp                     {   the end and the first        }
          OR (jbeg^.next = NIL);         {   expandable character         }
IF chars = 0 THEN                        { If no chars                    }
  BEGIN                                  {                                }
    IF spaces <> 0 THEN                  { If spaces only                 }
      BEGIN                              {                                }
        expval := expand DIV spaces;     { Compute amount to expand       }
        remain := expand MOD spaces;     {                                }
        exptot := expand;                { Compute total to distribute    }
                                         {   to current character         }
        IF splast THEN                   { If last char is a space        }
          BEGIN                          {                                }
            exptot := exptot - expval;   { Move last space now            }
            jend^.hpos := jend^.hpos +   {                                }
                                expval;  {                                }
          END;                           {                                }
        distribute(                      { Expand characters              }
                   TRUE                  {   Interword expansion          }
                                    );   {                                }
      END;                               {                                }
  END                                    {                                }
ELSE IF spaces = 0 THEN                  { If chars only                  }
  BEGIN                                  {                                }
    expval := expand DIV chars;          { Compute amount to expand       }
    remain := expand MOD chars;          {                                }
    ilecheck := (n_ilefail * hmi)        {                                }
                        DIV d_ilefail;   {                                }
    IF remfail > hmi THEN                { If insufficient granularity    }
      remain := 0;                       {   Don't distribute remaindr    }
    IF expval >= ilecheck THEN           { Do not exceed max expansion    }
      BEGIN                              {   for interletter              }
        expval := ilecheck;              {                                }
        remain := 0;                     {                                }
      END;                               {                                }
    exptot := expval * chars + remain;   {                                }
    distribute(                          { Expand characters              }
               FALSE                     {   Interletter expansion        }
                                    );   {                                }
  END                                    {                                }
ELSE                                     { If both spaces and chars       }
  BEGIN                                  {                                }
    expval := expand DIV                 { Compute portion to expand      }
        (chars + (sc_ratio * spaces));   {   interletter                  }
    ilecheck := (n_ilefail * hmi)        {                                }
```

```
                DIV d_ilefail;
IF expval > ilecheck THEN
    expval := ilecheck;
remain := 0;
exptot := expval * chars;
distribute(
            FALSE            );
expand := expand - (expval * chars);
expval := expand DIV spaces;
remain := expand MOD spaces;
exptot := expand;

IF splast THEN
    BEGIN
        exptot := exptot - expval;
        jend^.hpos := jend^.hpos +
                                    expval;

END;
    distribute(
            TRUE             );
END;

END;

IF jbgprv <> NIL THEN
    jbeg^.prev := jbgprv;

END;
```

```
{                                           }
{  Do not exceed max amount to              }
{    expand interletter                     }
{  Distribute remndr interword              }
{                                           }
{  Expand characters                        }
{    Expand interletter first               }
{  Compute remaining amount                 }
{    to expand interword                    }
{                                           }
{  Compute total to distribute              }
{    to current character                   }
{  If last char is a space                  }
{                                           }
{  Move last space now                      }
{                                           }
{                                           }
{                                           }
{  Expand characters                        }
{    Expand interword                       }
{                                           }
{                                           }
{                                           }
{                                           }
{  Check for NIL                            }
{  Reattach semi-linked list                }
{                                           }
{                                           }
{  ZJSTFY                                   }
```

What is claimed is:

1. An automated method of performing text justification to expand text within a line to produce flush left and right margins on an output medium comprising the steps of:
   A. determining the number of expandable interword positions within the line (SPACES);
   B. determining the number of expandable intercharacter positions within the line (CHARS);
   C. determining the amount of expansion required within the line to a justified margin (EXPAND) by subtracting the width of the text from the total line width, the width of the text and the total line width being expressed in terms of horizontal granular units which correspond to the smallest horizontal distance the printhead of the output device can traverse along a line under control of the justification process, the value of a horizontal granular unit not being known to the justification process;
   D. if both CHARS and SPACES are greater than 0:
      (1) compute portion of EXPAND which is to go between characters and distribute it in expandable intercharacter positions; and
      (2) compute portion of EXPAND which is to go between words and distribute it in expandable interword positions;
   E. If CHARS is equal to 0, distribute EXPAND into expandable interword positions;
   F. If SPACES is equal to 0, distribute EXPAND into expandable intercharacter positions;

2. The method of claim 1, step A, where determining expandable interword positions is done by counting expandable space characters in the line.

3. The method of claim 1, step B, where determini expandable intercharacter positions is done by counti the number of non-space characters that are not at end of a word and subtract the number of charact that have a composite flag set.

4. The method of claim 1, step C, where the amo of expansion is determined by subtracting the width the text from the total line width.

5. The method of claim 4 where the width of text the total line width are expressed in terms of horizo granular units which correspond to the smallest h zontal distance the printhead of the output device traverse along a line under the control of the justif tion process.

6. The method of claim 1 wherein a defined rati used to determine the portion of the total expansio be done by intercharacter expansion and the portio the total expansion to be done by interword expans 7. The method of claim 1 wherein interchara expansion is limited to some defined maximum so too much expansion does not occur between charac within a word.

8. The method of claim 1, steps D(1) and D wherein any expansion remainder which canno uniformly distributed in a line is distributed at alte ing ends of consecutive lines to reduce the appear of rivers in justified text.

9. The method of claim 1 wherein distribution o expansion is done by augmenting a horizontal pos count associated with each character that is t moved during the justification process.

10. The method of claim 9 wherein the horiz position count is maintained in horizontal gra units.

* * * * *